US011687088B2

(12) United States Patent
Yamamoto et al.

(10) Patent No.: US 11,687,088 B2
(45) Date of Patent: Jun. 27, 2023

(54) VEHICULAR SYSTEM

(71) Applicant: AICHI STEEL CORPORATION, Tokai (JP)

(72) Inventors: Michiharu Yamamoto, Tokai (JP); Tomohiko Nagao, Tokai (JP); Hitoshi Aoyama, Tokai (JP)

(73) Assignee: AICHI STEEL CORPORATION, Tokai (JP)

( * ) Notice: Subject to any disclaimer, the term of this patent is extended or adjusted under 35 U.S.C. 154(b) by 276 days.

(21) Appl. No.: 17/261,590

(22) PCT Filed: Jul. 18, 2019

(86) PCT No.: PCT/JP2019/028373
§ 371 (c)(1),
(2) Date: Jan. 20, 2021

(87) PCT Pub. No.: WO2020/022196
PCT Pub. Date: Jan. 30, 2020

(65) Prior Publication Data
US 2021/0271261 A1    Sep. 2, 2021

(30) Foreign Application Priority Data

Jul. 25, 2018    (JP) .............................. JP2018-139012

(51) Int. Cl.
G05D 1/02        (2020.01)
G05D 1/03        (2006.01)
G08G 1/042       (2006.01)

(52) U.S. Cl.
CPC ......... G05D 1/0259 (2013.01); G05D 1/0287 (2013.01); G05D 1/03 (2013.01); G08G 1/042 (2013.01); G05D 2201/0205 (2013.01)

(58) Field of Classification Search
CPC ...... G05D 1/0259; G05D 1/0287; G05D 1/03; G05D 2201/0205; G05D 2201/0213; G08G 1/042; G01C 21/28; G01C 21/3407
See application file for complete search history.

(56) References Cited

U.S. PATENT DOCUMENTS 4,847,773 A    7/1989  van Helsdingen et al.
2014/0309812 A1  10/2014  Lee et al.
(Continued)

FOREIGN PATENT DOCUMENTS

CN    102682620 A    9/2012
CN    106249736 A *  12/2016  .......... G05D 1/0259
(Continued)

OTHER PUBLICATIONS

CN-106249736-A English Translation.*
(Continued)

Primary Examiner — Rami Khatib
Assistant Examiner — Gabriel Joseph Rene Lambert
(74) Attorney, Agent, or Firm — Renner, Otto, Boisselle & Sklar, LLP

(57) ABSTRACT

A vehicular system where a vehicle moves in a traveling area in which magnetic markers are arranged so that magnetic polarities form a predetermined pattern and a wireless tag is annexed correspondingly to some of the magnetic markers, the wireless tag outputting, by wireless communication, tag information allowing a position of the magnetic marker to be identified, includes a first position identifying part which identifies a vehicle position where the vehicle is located based on the position of the magnetic marker identified by using the tag information and a second position identifying part which identifies, on a route after the vehicle passes over the magnetic marker serving as a reference when the first position identifying part identifies the vehicle position, a (Continued)

magnetic marker newly detected by the vehicle based on detection history of magnetic markers and identifies the vehicle position based on the position of the identified magnetic marker.

20 Claims, 18 Drawing Sheets

(56) References Cited

U.S. PATENT DOCUMENTS

2018/0356230 A1    12/2018  Zhu
2018/0356232 A1*   12/2018  Zhu ...................... G01C 21/206

FOREIGN PATENT DOCUMENTS

| CN | 106249736 | A |   | 12/2016 |            |
|----|-----------|---|---|---------|------------|
| CN | 107160397 | A |   | 9/2017  |            |
| JP | H06-265615 | A |  | 9/1994  |            |
| JP | H06265615 | A | * | 9/1994  | ... G01S 1/00 |
| JP | 2001-60111 | A |  | 3/2001  |            |
| JP | 2001-322720 | A | | 11/2001 |            |
| JP | 2004-255529 | A | | 9/2004  |            |
| JP | 2006-65703 | A |  | 3/2006  |            |
| JP | 2008-9534 | A |   | 1/2008  |            |
| JP | 2013171368 | A |  | 9/2013  |            |
| KR | 10-2011-0081452 | A | | 7/2011 |          |
| KR | 101704192 | B1 |  | 2/2017  |            |
| WO | 2011/084012 | A2 | | 7/2011  |            |
| WO | 2017187881 | A1 |  | 11/2017 |            |

OTHER PUBLICATIONS

JPH06265615A English Translation.*
International Search Report for corresponding Application No. PCT/JP2019/028373, dated Oct. 8, 2019.
Communication Pursuant to Article 94(3) EPC corresponding to European Patent Application 19841688.5 dated Nov. 17, 2022.
Extended European Search Report corresponding to European Patent Application 19841688.5 dated Mar. 10, 2022.

* cited by examiner

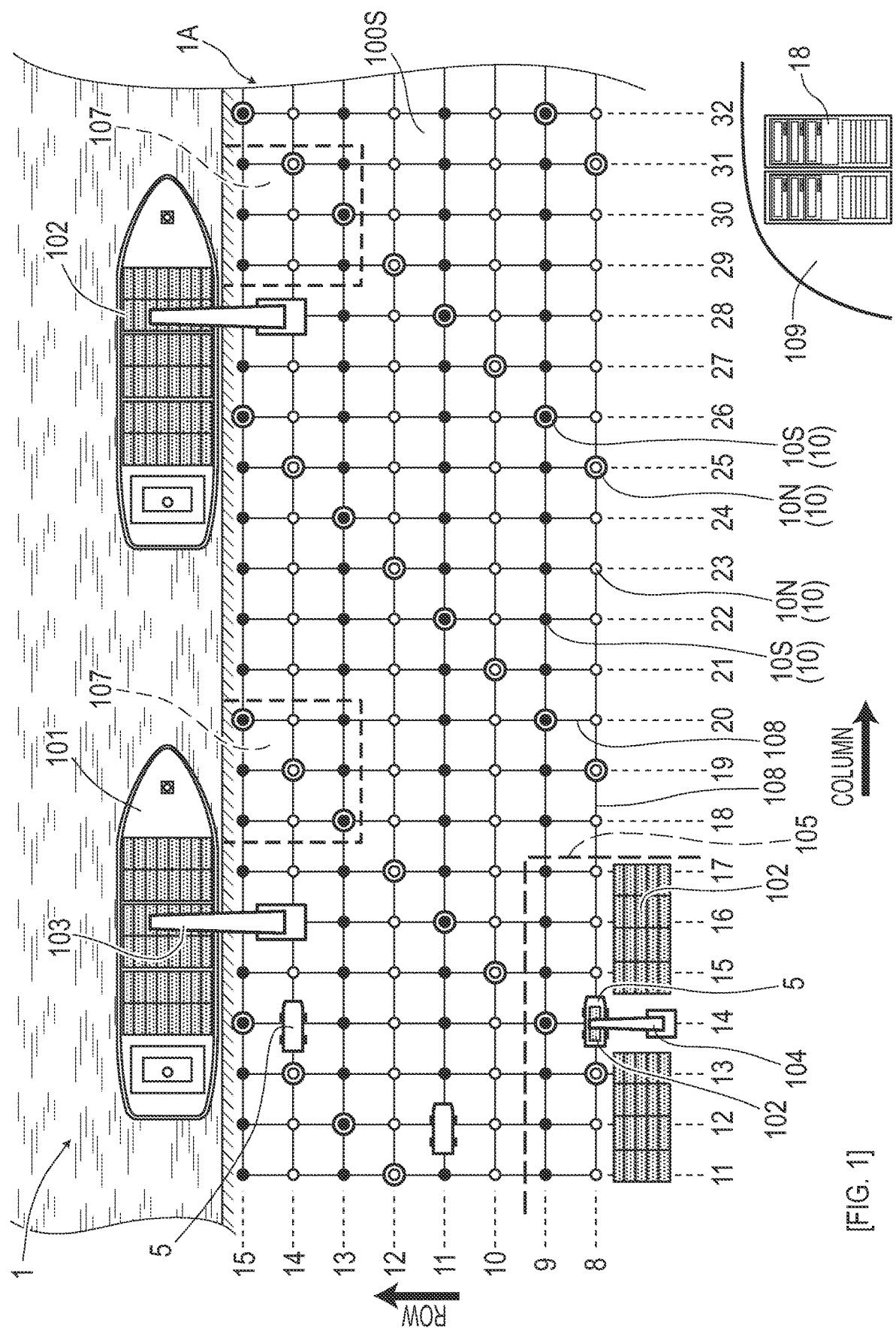
[FIG. 1]

[FIG.2]
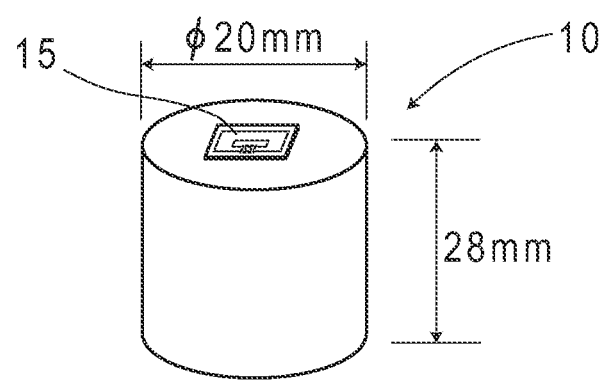

[FIG.3]
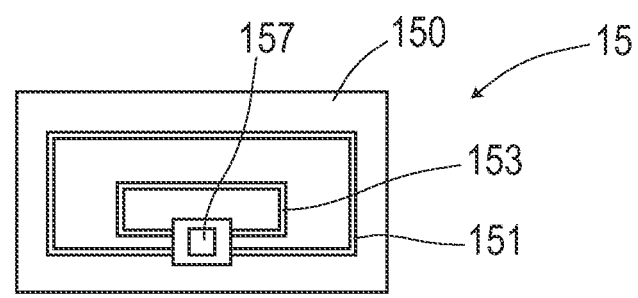

[FIG.4]
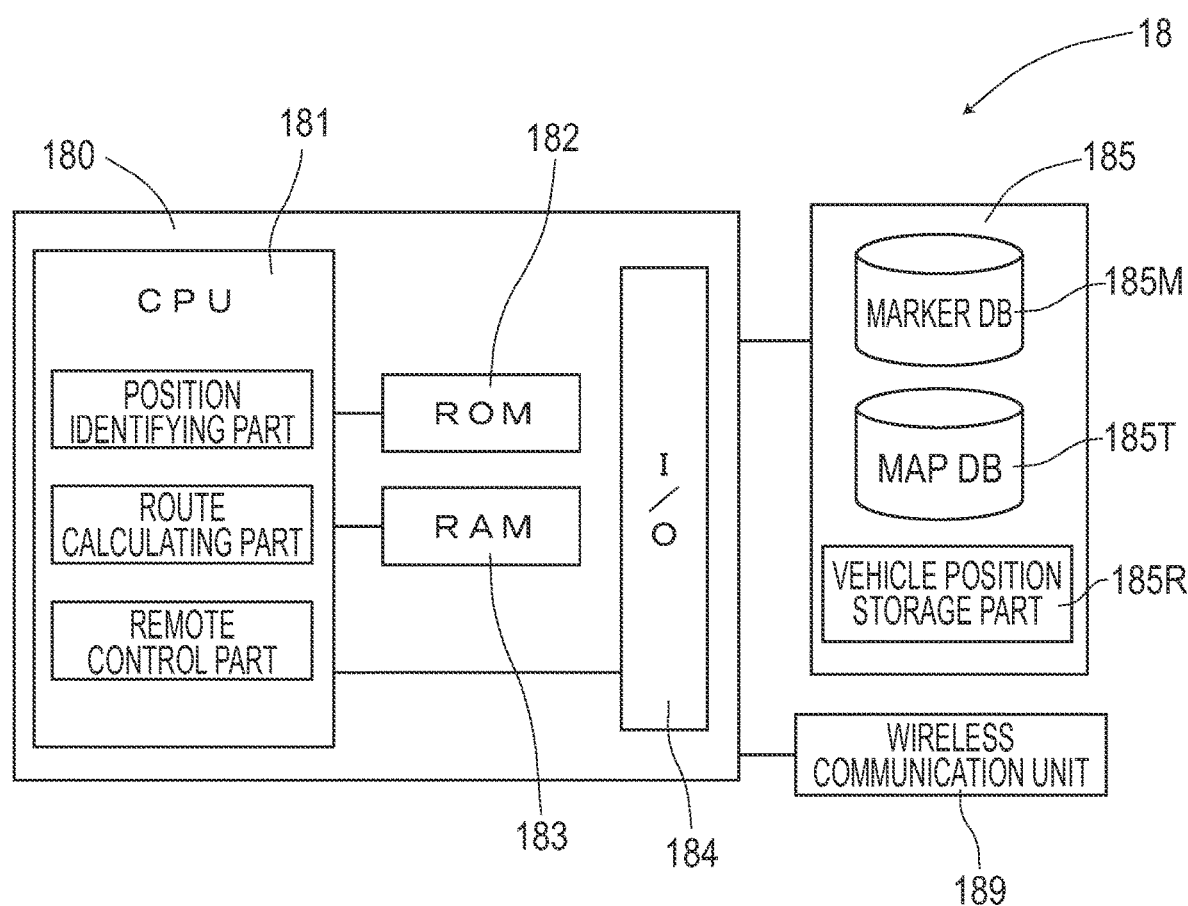

[FIG.5]
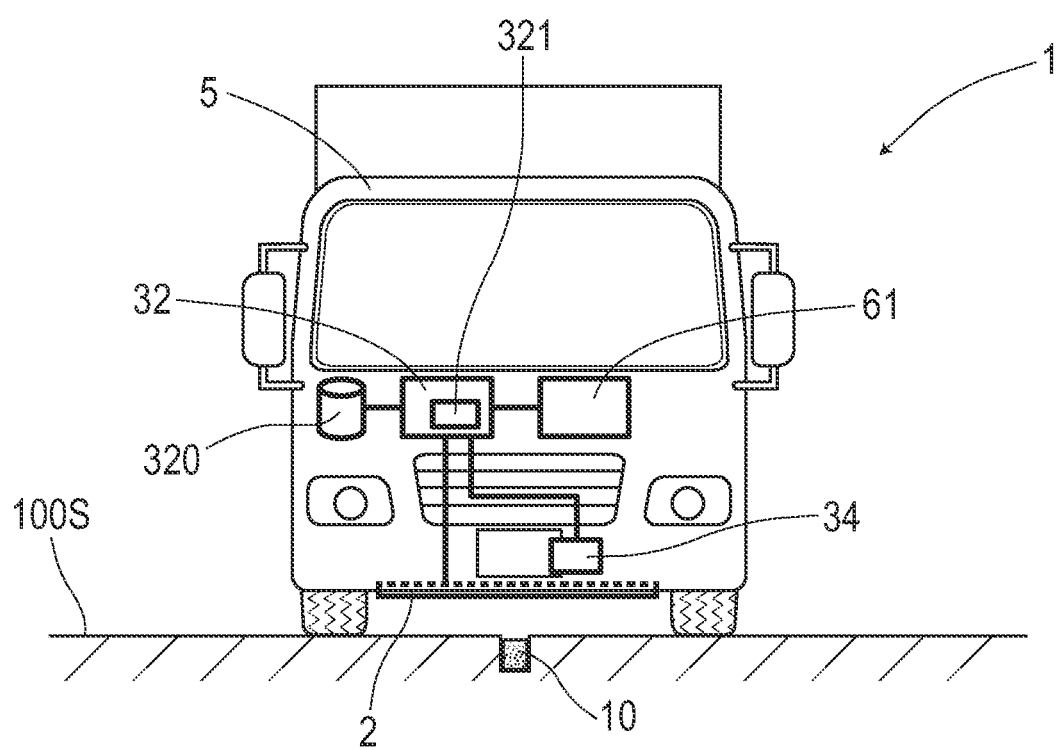

[FIG.6]
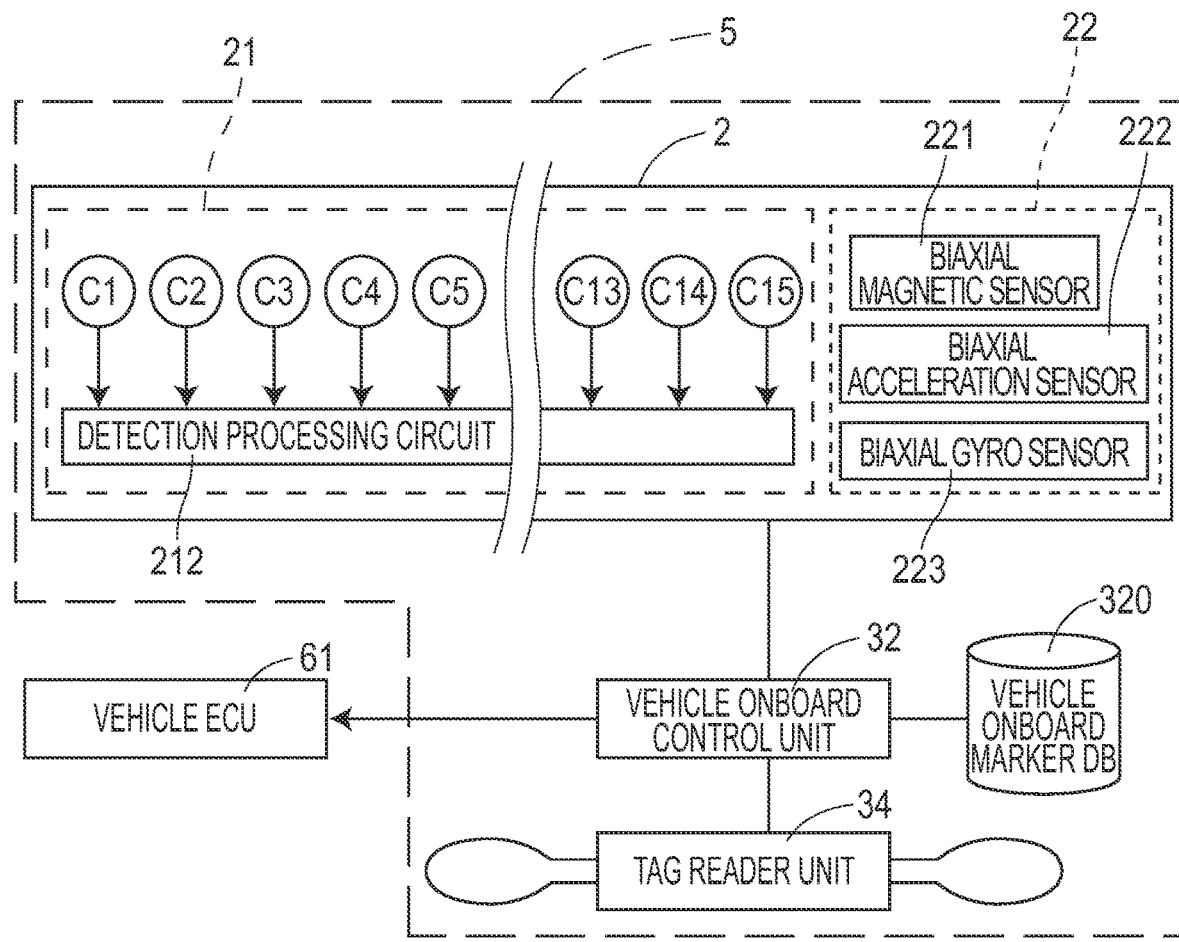

[FIG.7]
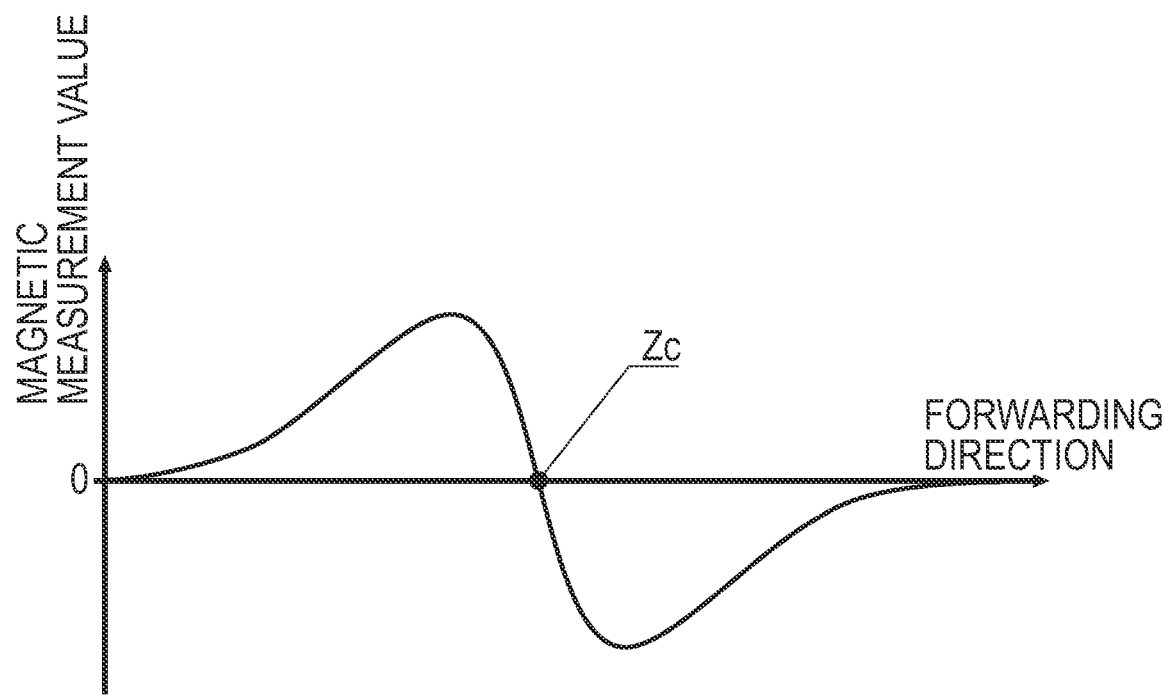

[FIG.8]
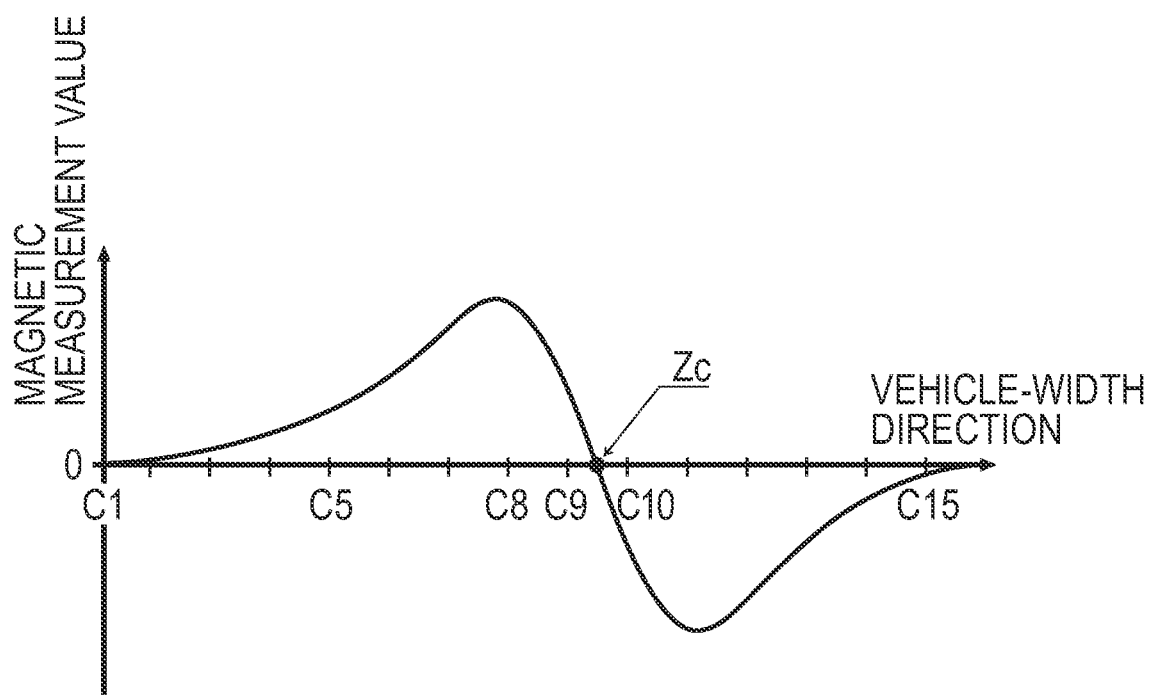

[FIG.9]
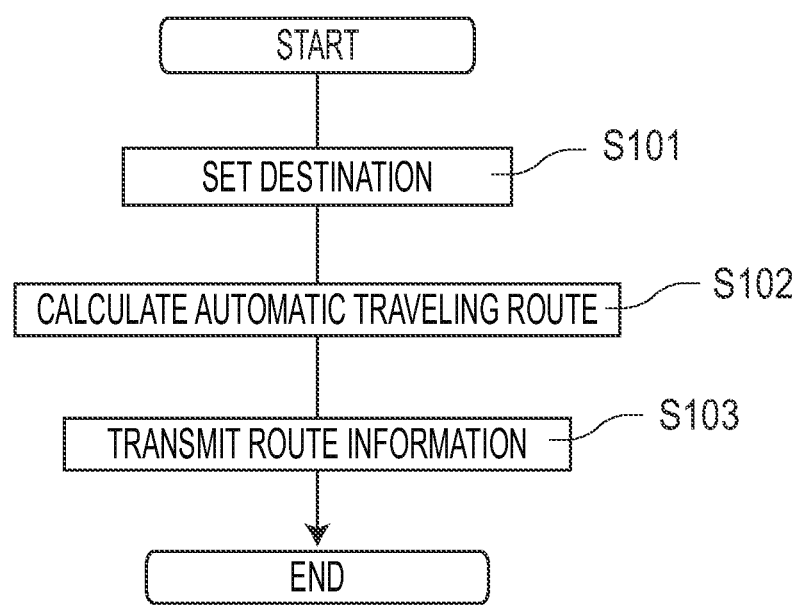

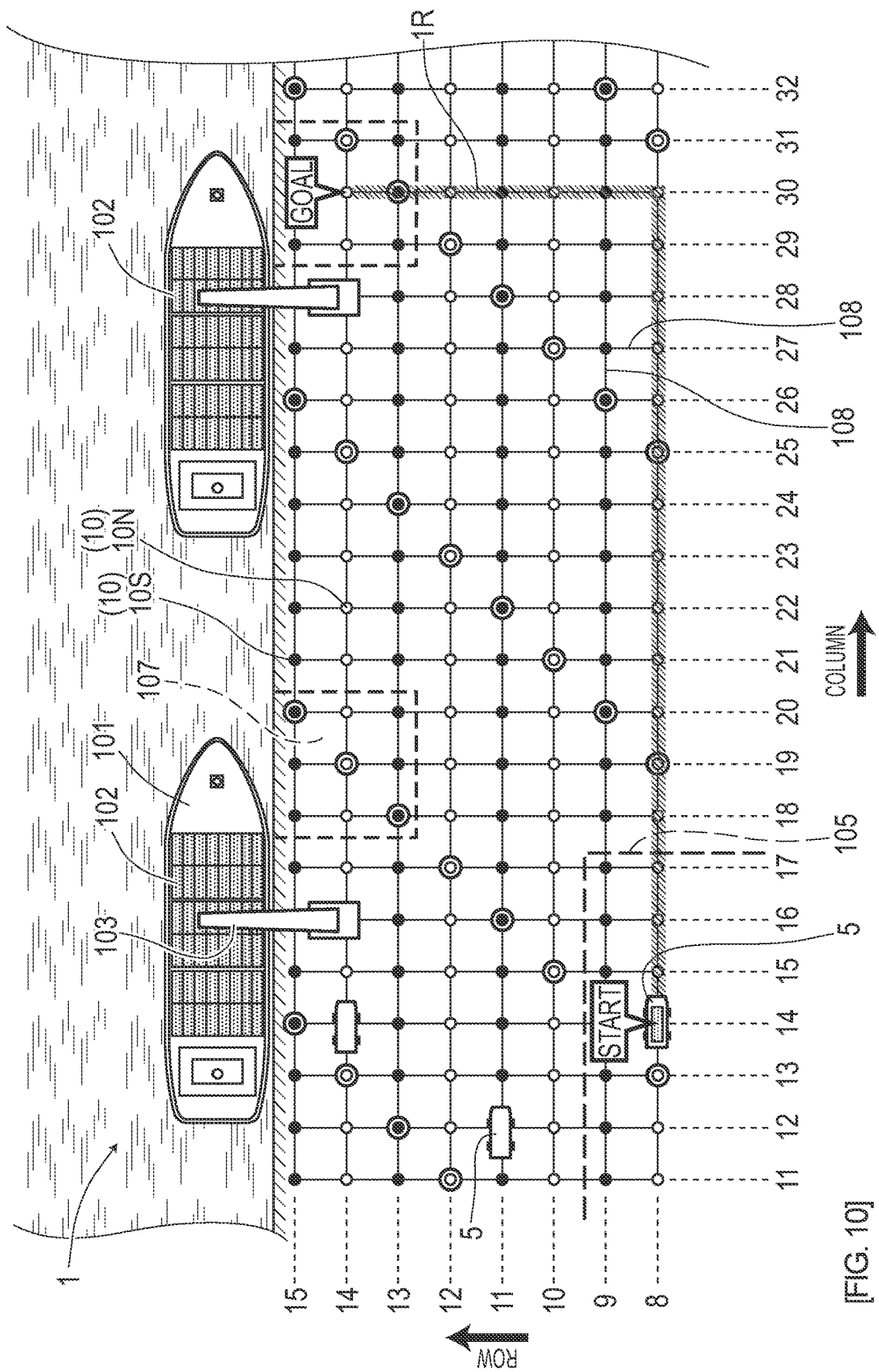
[FIG. 10]

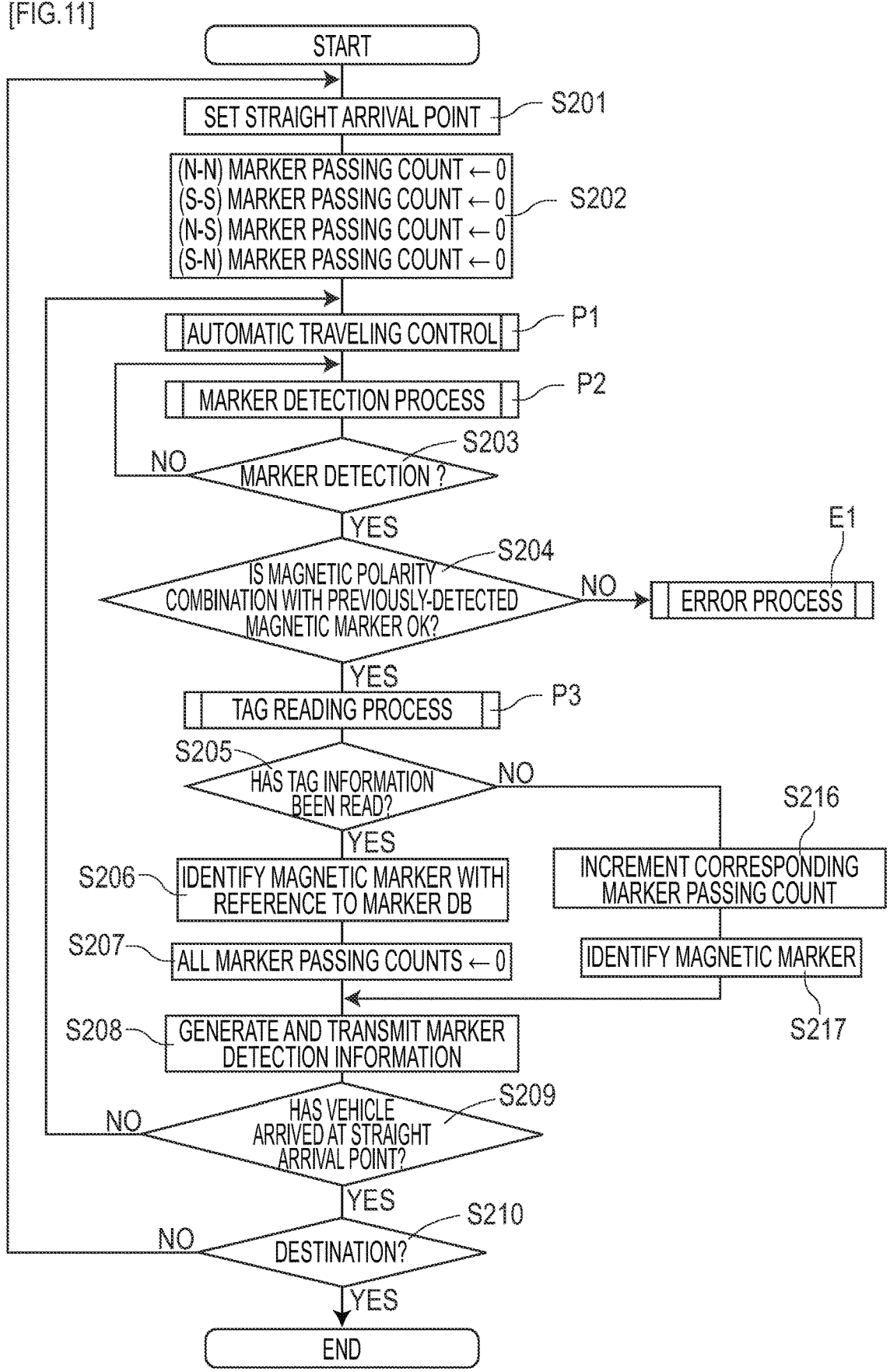

[FIG.12]
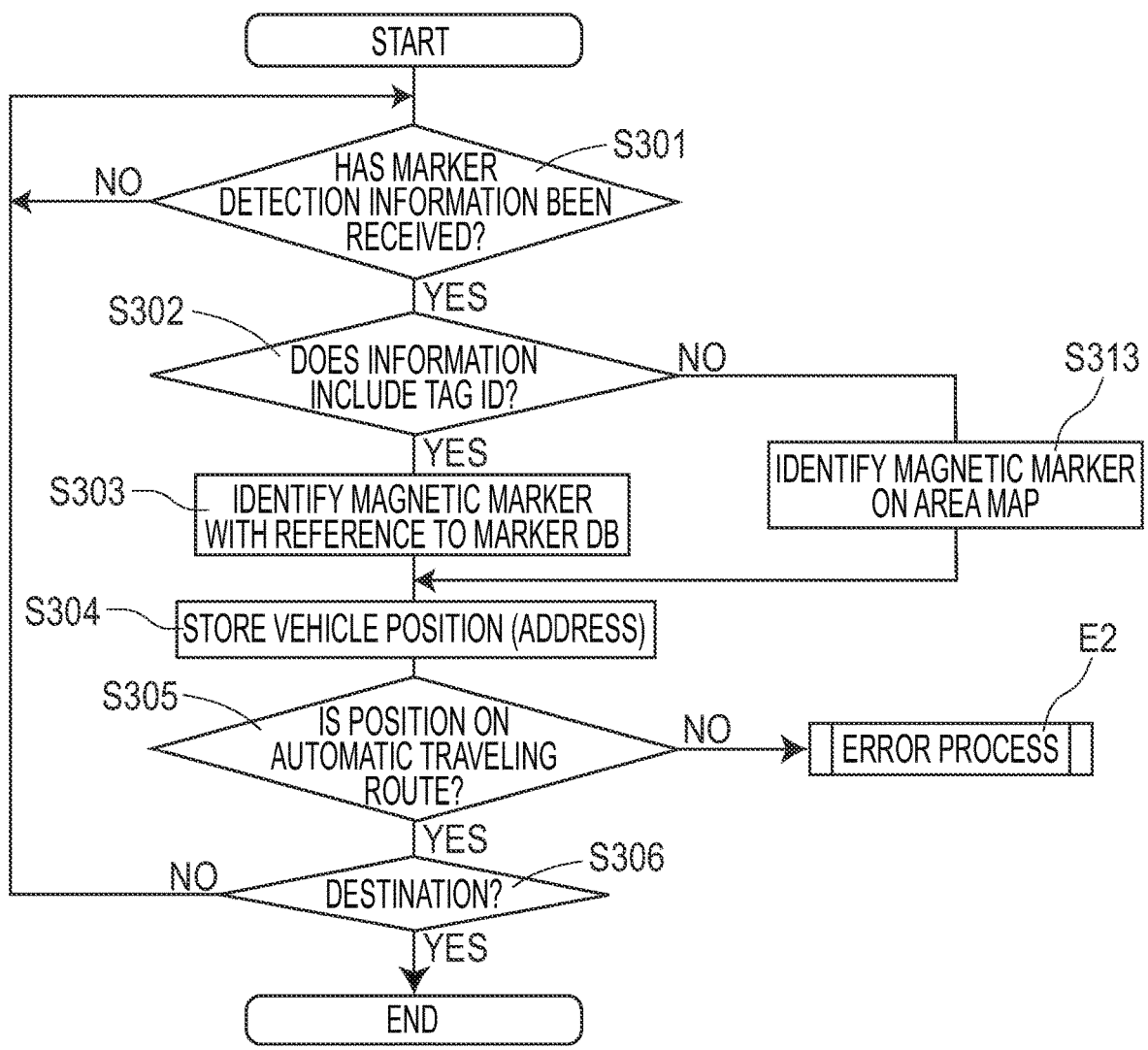

[FIG.13]
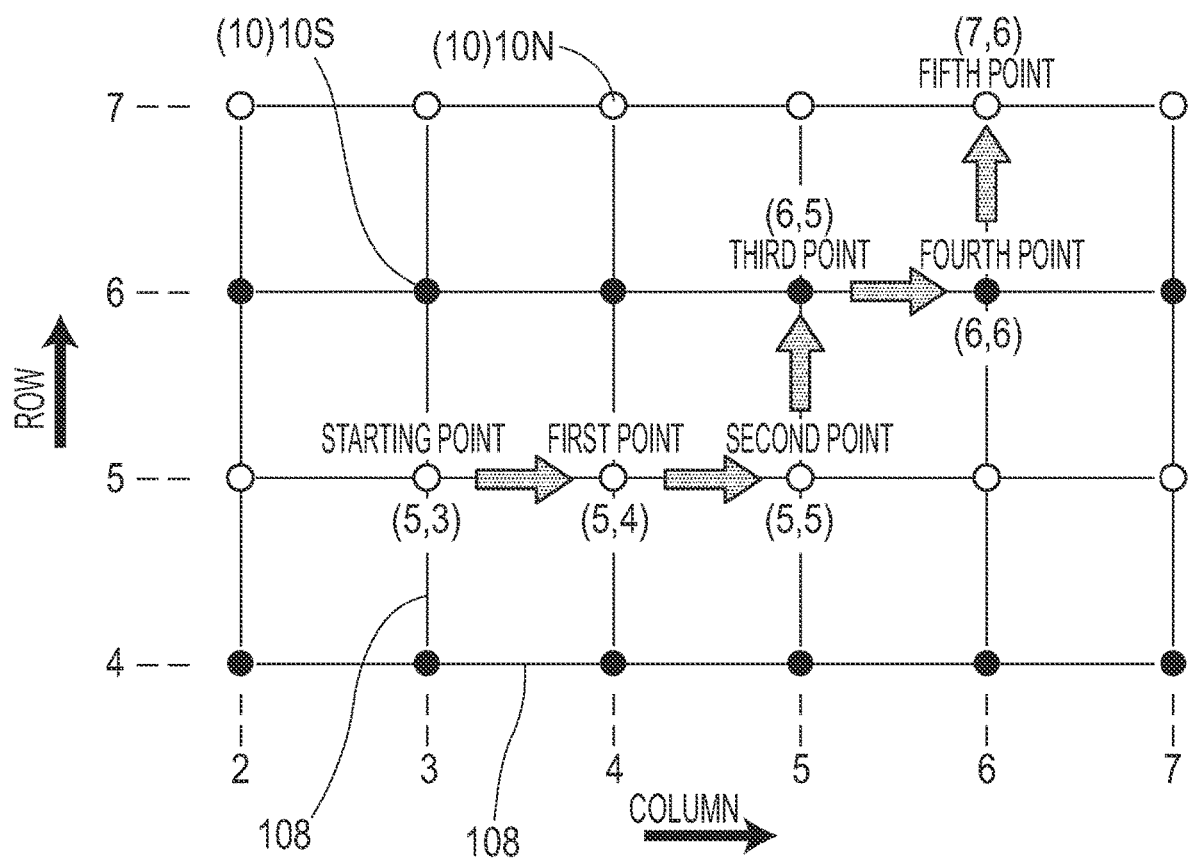

[FIG.14]

| DETECTION HISTORY | No.1 | No.2 | No.3 | No.4 | No.5 |
|---|---|---|---|---|---|
| MAGNETIC POLARITIES | N-N | N-N | N-S | S-S | S-N |

[FIG.15]
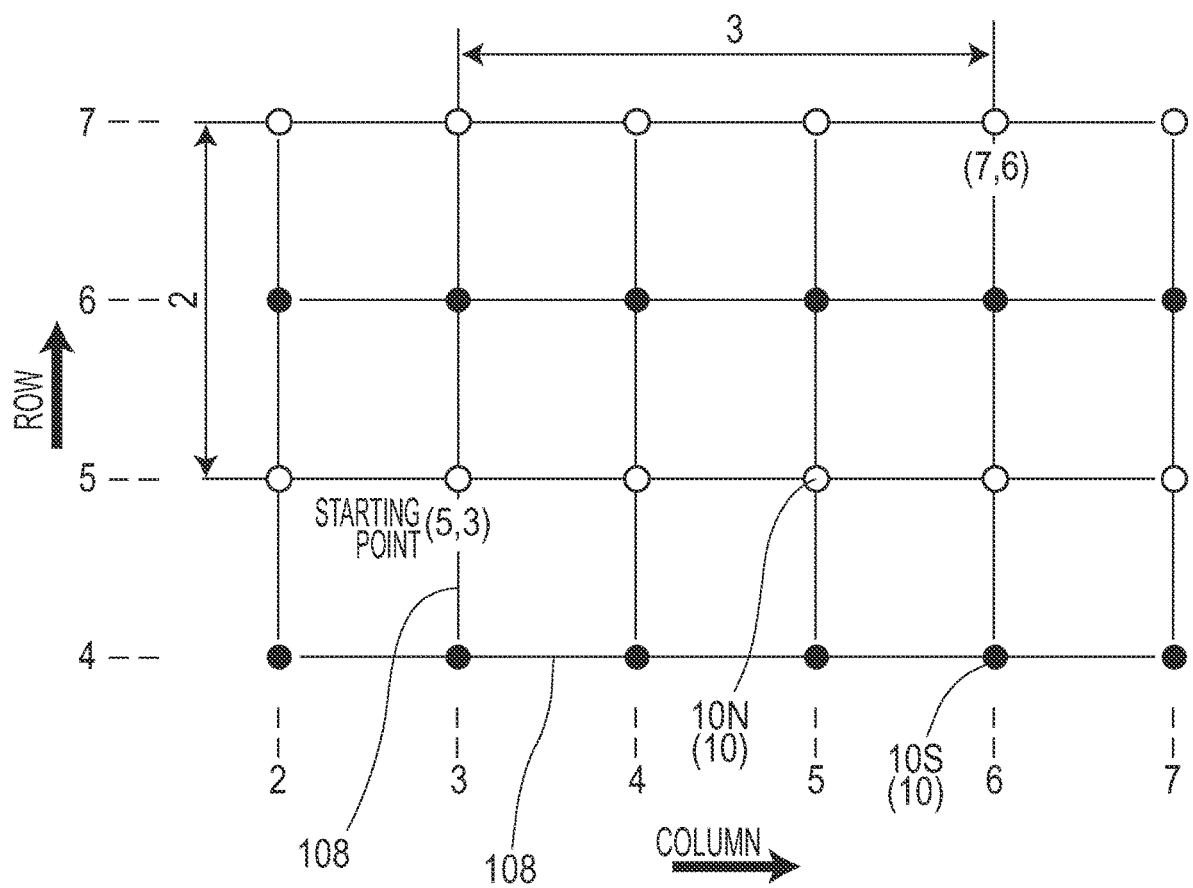

[FIG.16]

| DETECTION HISTORY | No.1 | No.2 | No.3 | No.4 | No.5 |
|---|---|---|---|---|---|
| MAGNETIC POLARITIES | N-N | N-N | N-S | S-S | S-N |
| MOVING DIRECTION | ⇒ | ⇒ | ⇑ | ⇒ | ⇑ |

[FIG.17]
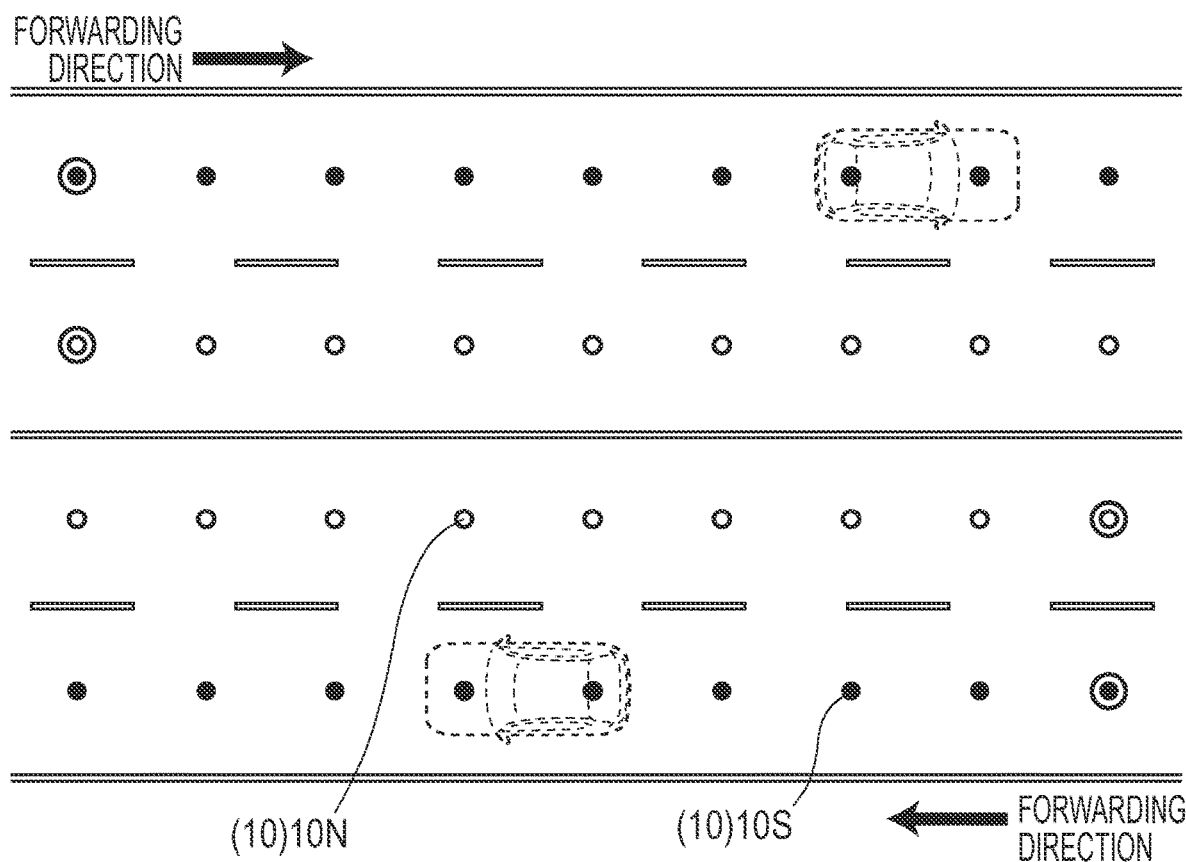

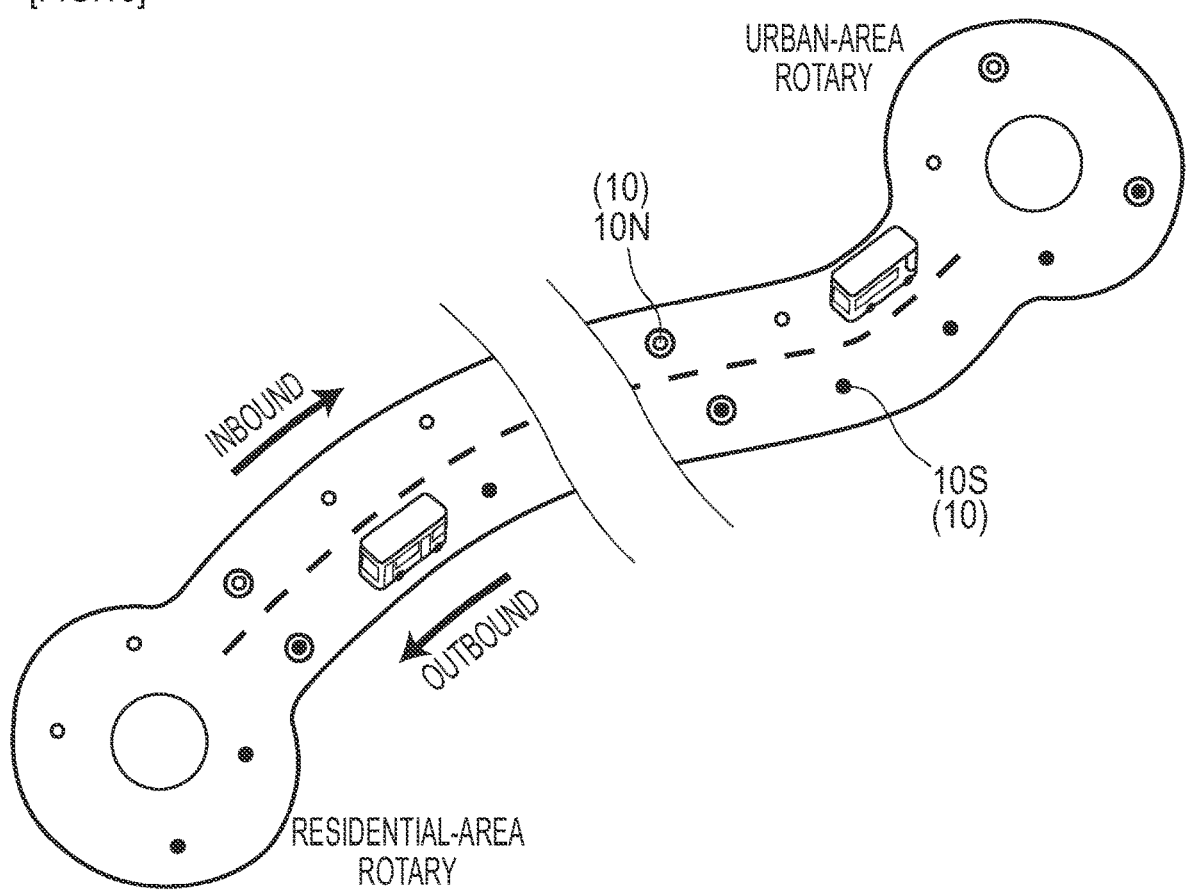

VEHICULAR SYSTEM

TECHNICAL FIELD

The present invention relates to vehicular systems where vehicles move in a traveling area.

BACKGROUND ART

Conventionally, traveling areas for vehicles carrying out various works are provided in, for example, airports, harbors, and so forth. For example, in an airport, vehicles called GSE (Ground Support Equipment) vehicles are operated for purposes of transportation of passengers, conveyance of baggage, fuel supply to passenger aircrafts, and so forth. Also, in a container yard in a harbor or the like, vehicles for moving containers are operated (for example, refer to Patent Literature 1). To operate these vehicles, a large amount of manpower is required. Thus, technologies for reducing cost required to operate the vehicles have been strongly demanded.

CITATION LIST

Patent Literature

Patent Literature 1: Japanese Unexamined Patent Application Publication No. 2001-322720

SUMMARY OF INVENTION

Technical Problem

For example, when transfer vehicles traveling along a magnetic tape laid on a floor surface in a factory are used, it is relatively easy to identify positions of the vehicles, and it is possible to achieve management, control, and so forth of working vehicles relatively at low cost. On the other hand, for vehicles operated in the container yard in the harbor, the airport, or the like and moving in the traveling area with a high degree of flexibility, due to difficulty in identifying the positions of the vehicles, there is a problem in which it is not easy to establish a technology for reducing cost required to manage and control the vehicles. For example, there is a technology of positioning a vehicle position by using GPS (Global Positioning System). In operation of the vehicle in the container yard in the harbor, the airport, and so forth, there are many traveling environments that inhibit a favorable state of reception of GPS radio waves, such as a passage beside metal-made containers which reflect the radio waves and a passage inside an airport facility.

The present invention was made in view of the above-described conventional problem, and is to provide a vehicular system suitable for management, control, and so forth of a vehicle moving in a traveling area.

Solution to Problem

The present invention resides in a vehicular system where a vehicle moves in a traveling area, wherein in the traveling area, magnetic markers as magnetism generation sources are arranged so that magnetic polarities form a predetermined pattern, and a wireless tag which outputs tag information via wireless communication is annexed to some of the magnetic markers, the tag information allowing a position of the some of the magnetic markers to be identified, and the system includes:

a first position identifying part which identifies a vehicle position where the vehicle is located based on the position of a magnetic marker of the magnetic markers identified by using the tag information; and a second position identifying part which identifies, on a route after the vehicle passes over the magnetic marker serving as a reference when the first position identifying part identifies the vehicle position, a magnetic marker newly detected by the vehicle by using detection history indicating history information of a magnetic marker detected by the vehicle and including information about a magnetic polarity of the magnetic marker detected, and identifies the vehicle position based on the position of the magnetic marker newly detected.

Advantageous Effects of Invention

In the traveling area at which the vehicular system of the present invention is targeted, the wireless tag is annexed to each of some of the magnetic markers. When the vehicle detects the magnetic marker with the wireless tag annexed thereto, the magnetic marker can be identified by using the tag information, and the vehicle position can be identified based on the position of that magnetic marker.

Also, in the traveling area at which the vehicular system of the present invention is targeted, the magnetic markers are arranged so that the magnetic polarities form the predetermined pattern. Thus, on the route after the vehicle passes over the magnetic marker with the wireless tag annexed thereto, to identify the magnetic marker detected by the vehicle, the detection history of the magnetic marker including information about the magnetic polarity can be used. By using this detection history, the magnetic marker detected by the vehicle can be identified with high reliability. And, based on the position of thus identified magnetic marker, the vehicle position can be identified relatively with ease.

As described above, the vehicular system of the present invention is a system allowing the position of the vehicle in the traveling area to be identified with high reliability, and is suitable for management, control, and so forth of the vehicle moving in the traveling area.

BRIEF DESCRIPTION OF DRAWINGS

FIG. 1 is a descriptive diagram of a working vehicle system targeted at working vehicles in a container yard in a first embodiment.

FIG. 2 is a perspective view of a magnetic marker with an RFID tag attached thereto in the first embodiment.

FIG. 3 is a front view of the RFID tag in the first embodiment.

FIG. 4 is a diagram of a configuration of a server apparatus in the first embodiment.

FIG. 5 is a descriptive diagram of a working vehicle and the magnetic marker in the first embodiment.

FIG. 6 is a block diagram depicting a system configuration of the working vehicle in the first embodiment.

FIG. 7 is a graph exemplarily depicting changes of magnetic measurement values when the vehicle passes over the magnetic marker in the first embodiment.

FIG. 8 is a graph exemplarily depicting a distribution of magnetic measurement values in a vehicle-width direction when passing over the magnetic marker in the first embodiment.

FIG. 9 is a flow diagram depicting a flow of a remote control start process by the server apparatus in the first embodiment.

FIG. 10 is a descriptive diagram exemplarily depicting an automatic traveling route in the first embodiment.

FIG. 11 is a flow diagram depicting a flow of automatic traveling control by the working vehicle in the first embodiment.

FIG. 12 is a flow diagram depicting a flow of a process during remote control by the server apparatus in the first embodiment.

FIG. 13 is a descriptive diagram depicting an example of a movement route of the working vehicle in the first embodiment.

FIG. 14 is a descriptive diagram depicting an example of magnetic marker detection history in the first embodiment.

FIG. 15 is a descriptive diagram of a method of identifying a movement destination of the working vehicle in the first embodiment.

FIG. 16 is a descriptive diagram depicting another example of the magnetic marker detection history in the first embodiment.

FIG. 17 is a descriptive diagram depicting an example of arrangement of magnetic markers in a road with two lanes on each side in a second embodiment.

FIG. 18 is a descriptive diagram depicting an example of arrangement of magnetic markers on a BRT route in the second embodiment.

DESCRIPTION OF EMBODIMENTS

Modes for implementation of the present invention are specifically described by using the following embodiments.

First Embodiment

The present embodiment is an example regarding a vehicular system for managing vehicles in a traveling area. Details of this are described by using FIG. 1 to FIG. 16.

Working vehicle system 1 of FIG. 1, which is one example of the vehicular system, is a system for managing working vehicles (vehicles) 5 moving in working area LA. Working area LA is, for example, a working area provided in a container yard alongside which container ships 101 are laid. This working area 1A is provided with marshalling yard 105, which is a carry-in area of containers 102; loading/unloading areas 107 where containers 102 are shipped; and so forth. Working vehicles 5 carry out a work of delivering containers 102 between marshalling yard 105 and loading/unloading areas 107.

Marshalling yard 105 is provided with small crane 104 for transferring carried-in and stacked containers 102 to working vehicles 5. In marshalling yard 105, crane 104 lifts up containers 102 for transferring to working vehicle 5. Large crane 103 for shipment is provided adjacent to loading/unloading areas 107. And, in loading/unloading area 107, a lifting-up place for containers 102 to be shipped is provided. In loading/unloading area 107, from working vehicle 5 stopped at the lifting-up place, crane 103 lifts up containers 102 for shipment.

In working area 1A (FIG. 1), passages 108 where working vehicles 5 can move are provided in a grid pattern with 10-meter pitches in each of vertical and horizontal directions, and magnetic marker 10 is arranged at each grid point where passages 108 intersect each other. In working vehicle system 1, for example, under management by server apparatus 18 set inside harbor management facility 109, a plurality of working vehicles 5 perform works of conveying containers 102 by moving inside working area 1A so as not to interfere with one another.

In FIG. 1 exemplarily depicting working area 1A, N-pole magnetic marker 10N is depicted as a hollow circle, and S-pole magnetic marker 10S is depicted as a solid circle. As in the drawing, in working area 1A, magnetic markers 10 are arranged so that a row where N-pole magnetic markers 10N are arrayed and a row where S-pole magnetic markers 10S are arrayed alternately appear.

To each of some of magnetic markers 10 in working area 1A, RFID tag 15 is annexed, which transmits (outputs) tag information via wireless communication. In FIG. 1, with a circle provided outside the hollow circle or the solid circle indicating magnetic marker 10, magnetic marker (tag-equipped marker) 10 having RFID tag 15 annexed thereto is depicted so as to be identifiable.

In working vehicle system 1, each grid point where passages 108 cross in working area 1A is identified by an address on a row and a column. Therefore, in working vehicle system 1, each magnetic marker 10 arranged at each grid point can be identified by the address on the row and the column. The ascending order of row numbers configuring addresses goes toward an upward direction in an up-down direction in FIG. 1. Also, the ascending order of column numbers goes toward a right direction in a left-right direction in FIG. 1. In working area 1A, loading/unloading areas 107 are positioned upper right in the drawing with respect to marshalling yard 105. Therefore, the addresses of loading/unloading areas 107 are positioned on a side where both of the row number and the column number ascend with respect to the address of marshalling yard 105.

Working vehicle 5 departing from marshalling yard 105 can arrive at loading/unloading area 107 by moving to either a side where the row number ascends or a side where the column number ascends. Thus, in the present embodiment, in a case from marshalling yard 105 toward loading/unloading area 107, moving directions of working vehicle 5 are limited to two directions, that is, a row-ascending direction in which the row number increases but the column number does not change and a column-ascending direction in which the column number increases but the row number does not change. Note that in a case from loading/unloading area 107 toward marshalling yard 105, the moving directions of working vehicle 5 are preferably limited to two directions opposite to the two directions.

In working vehicle system 1 (FIG. 1), server apparatus 18 and working vehicle 5 are communicably connected via wireless communication. Server apparatus 18 manages a vehicle position of each working vehicle 5, and calculates a route where each working vehicle 5 is caused to move (automatic traveling route) and remotely controls working vehicle 5 so as to travel along that route. Working vehicle 5 transmits marker detection information to server apparatus 18 whenever detecting magnetic marker 10. Server apparatus 18 transmits route information to working vehicle 5 as a transmission source of the marker detection information. Working vehicle 5 automatically travels so as to move along the route indicated by this route information.

In the following, general description is made to (1) magnetic marker 10 laid in working area 1A, and then description is made to the configurations of (2) server apparatus 18 and (3) working vehicle 5.

(1) Magnetic Marker

Magnetic marker 10 (FIG. 2) has a columnar shape having a diameter of 20 mm and a height of 28 mm. This magnetic marker 10 is laid in a state of being accommodated in a hole provided in road surface 100S (FIG. 1) where working vehicles 5 move. A magnet forming magnetic marker 10 is a ferrite plastic magnet or a ferrite rubber magnet with magnetic powder of iron oxide as a magnetic material dispersed in a polymer material as a base material. This magnet is a magnet with a characteristic of a maximum energy product (BHmax)=6.4 kJ/m$^3$. This magnetic marker 10 acts magnetism of a magnetic flux density of 8 μT (microtesla) at an upper-limit height of 250 mm in a range from 100 mm to 250 mm assumed as an attachment height of detection unit 2 (which will be described by referring to FIG. 5) on a working vehicle 5 side. In this magnetic marker 10, one of both ends of the columnar shape in an axial direction serves as the N pole, and the other serves as the S pole. By installing magnetic markers 10 top side down, switching can be made between magnetic marker 10N to be detected as the N pole and magnetic marker 10S to be detected as the S pole.

Note that, as in FIG. 2, RFID tag (Radio Frequency IDentification Tag, wireless tag) 15 which wirelessly outputs tag information is laminated and arranged on a surface of a road surface 100S side of each of some of magnetic markers 10. RFID tag 15 operates by wireless external power feeding, and externally outputs a tag ID forming one example of the tag information. In the following description, magnetic marker 10 with RFID tag 15 attached thereto is described as tag-equipped marker 10 as appropriate. Magnetic marker 10 without RFID tag 15 attached thereto is described as non-tag marker 10 as appropriate. Furthermore, when magnetic polarity distinction is necessary, it is exemplarily described as tag-equipped marker 10N (in the case of the N pole) or the like.

RFID tag 15 is an electronic component having IC chip 157 implemented on a surface of tag sheet 150 cut out from, for example, a PET (PolyEthylene Terephthalate) film, as in FIG. 3. On the surface of tag sheet 150, a printed pattern of loop coil 151 and antenna 153 is provided. Loop coil 151 is a receiving coil where an exciting current are generated by external electromagnetic induction. Antenna 153 is a transmission antenna for wireless transmission of the tag ID and so forth. As RFID tag 15, a wireless tag of a UHF band is preferably adopted.

(2) Server Apparatus

Server apparatus 18 is a computer apparatus configured mainly by electronic substrate 180 having implemented thereon electronic components such as CPU (Central Processing Unit) 181, ROM (Read Only Memory) 182, and RAM (Random Access Memory) 183, as in FIG. 4. To electronic substrate 180, storage device 185 such as a hard disk drive, wireless communication unit 189, and so forth are connected via I/O (Input/Output) 184. Server apparatus 18 includes following functions as respective parts. The functions of the respective parts (2.1) to (2.3) are achieved by CPU 181 processing software programs read from storage device 185. The functions of the respective parts (2.4) to (2.6) are achieved by using storage areas of RAM 183 and storage device 185.

(2.1) Position identifying part: Identifies the vehicle position where working vehicle 5 is positioned. The position identifying part identifies the vehicle position by the address of magnetic marker 10 detected by working vehicle 5. (2.2) Route calculating part: Calculates the route where working vehicle 5 is caused to move (automatic traveling route). For example, in a case of a work of conveying containers 102 to loading/unloading area 107, route calculating part determines, by calculation, the automatic traveling route from a current position of working vehicle 5 as a departure point to a delivery place via a receiving place. The receiving place is a point where containers 102 are received. The delivery place is a point where containers 102 are delivered. (2.3) Remote control part: Performs remote control so that working vehicle 5 is moved along the scheduled automatic traveling route. The remote control part remotely controls working vehicle 5 by transmitting the route information indicating the automatic traveling route where working vehicle 5 is caused to move.

(2.4) Marker database (marker DB) 185M: Marker DB 185M is a database having stored therein information about respective magnetic markers 10 arranged in working area 1A. The information about magnetic markers 10 includes, for example, information about the address, an absolute position, and magnetic polarity of each magnetic marker 10. Furthermore, the information about tag-equipped marker 10 has linked thereto (associated therewith) the tag ID (tag information), which is identification information of annexed RFID tag 15.

(2.5) Map database (map DB) 185T: Map DB 185T has stored therein map data having each magnetic marker 10 associated therewith on an area map representing working area 1A. To each magnetic marker 10 on the area map, information such as the address, the absolute position, and the magnetic polarity, is linked.

(2.6) Vehicle position storage part 185R: Stores the vehicle position identified by the above-described position identifying part.

(3) Working Vehicle

Working vehicle 5 is, for example, a vehicle having a vehicle width on the order of 3 m and an overall length on the order of 8 m. Working vehicle 5 can be loaded with a container having a width of 2.4 m and a length of 6 m. Working vehicle 5 includes two front wheels to be steered and two rear driving wheels. The wheels to be steered are steered as being driven by a steering actuator. The driving wheels are driven by a drive motor.

Working vehicle 5 includes, as in FIG. 5 and FIG. 6, detection unit 2 which detects magnetic marker 10 and so forth, tag reader unit 34 which acquires the tag ID from RFID tag 15, vehicle onboard control unit 32, and so forth. Furthermore, working vehicle 5 includes vehicle ECU (Electric Control Unit) 61 which controls the drive motor, a brake actuator, the steering actuator, and so forth. Vehicle ECU 61 can perform control of causing working vehicle 5 to automatically travel along the route information received from server apparatus 18. Note that while detection unit 2 and tag reader unit 34 are depicted as separate bodies for ease of understanding, a unit with these units integrated may be adopted.

(3.1) Detection Unit

Detection unit 2 is, as in FIG. 5 and FIG. 6, a rod-shaped unit having sensor array 21 as a magnetism detecting part and IMU (Inertial Measurement Unit) 22 integrated together. This detection unit 2 is attached, in a state of facing road surface 100S, to a front part of a vehicle body of working vehicle 5. In the case of working vehicle 5 of FIG. 5, an attachment height of detection unit 2 with reference to road surface 100S is 200 mm.

Sensor array 21 of detection unit 2 includes fifteen magnetic sensors Cn (n is an integer from 1 to 15) arrayed on a straight line and detection processing circuit 212 having incorporated therein a CPU and so forth not depicted. In sensor array 21, fifteen magnetic sensors Cn are equidistantly arranged with 10-centimeter pitches. Detection unit 2 is attached to working vehicle 5 so that the direction of arraying magnetic sensors Cn in sensor array 21 matches a vehicle-width direction.

Magnetic sensor Cn are sensors which detect magnetism by using the known MI effect (Magneto Impedance Effect) in which the impedance of a magneto-sensitive body such as an amorphous wire sensitively changes in response to an external magnetic field. In each magnetic sensor Cn, magneto-sensitive bodies such as amorphous wires not depicted are arranged along two directions orthogonal to each other, thereby allowing detection of magnetism acting in the two directions orthogonal to each other. Note in the present embodiment that magnetic sensors Cn are incorporated in sensor array 21 so as to be able to detect magnetic components in the forwarding direction and the vehicle-width direction.

Magnetic sensors Cn are highly-sensitive sensors having a measurement range of the magnetic flux density of ±0.6 mT and a magnetic flux resolution of 0.02 µT within the measurement range. Here, as described above, magnetic marker 10 can act magnetism having the magnetic flux density equal to or higher than 8 µT in a range of 100 mm to 250 mm assumed as the attachment height of magnetic sensors Cn. With magnetic marker 10 which acts magnetism equal or higher than the magnetic flux density of 8 µT, detection can be made with high reliability by using magnetic sensors Cn having the magnetic flux resolution of 0.02 µT.

Detection processing circuit 212 (FIG. 6) of sensor array 21 is an arithmetic circuit which performs a marker detection process for detecting magnetic marker 10. This detection processing circuit 212 is configured by using a CPU which performs various calculations as well as memory elements such as a ROM and RAM, and so forth.

Detection processing circuit 212 acquires a sensor signal outputted from each of magnetic sensors Cn in a cycle of 3 kHz, performs the marker detection process, and then inputs detection result of the marker detection process to vehicle onboard control unit 32. In this marker detection process of which description will be made in detail further below, in addition to detection of magnetic marker 10, detection of the magnetic polarity of magnetic marker 10 and measurement of a lateral shift amount of working vehicle 5 with respect to magnetic marker 10, and so forth are performed.

IMU 22 incorporated in detection unit 2 is a unit for inertial navigation. IMU 22 obtains measurement values required for estimation of a relative position of working vehicle 5 by inertial navigation. IMU 22 includes biaxial magnetic sensor 221 as an electronic compass which measures an azimuth, biaxial acceleration sensor 222 which measures acceleration, and biaxial gyro sensor 223 which measures angular velocity.

(3.2) Tag Reader Unit

Tag reader unit 34 of FIG. 6 is a communication unit which wirelessly communicates with RFID tag 15 laminated and arranged on the surface of magnetic marker 10 (FIG. 2). Tag reader unit 34 wirelessly transmits electric power required for operation of RFID tag 15 to cause RFID tag 15 to operate, and acquires the tag ID (tag information) as identification information of RFID tag 15.

(3.3) Vehicle Onboard Control Unit

Vehicle onboard control unit 32 (FIG. 6) is a unit which controls detection unit 2 and tag reader unit 34 and also performs control for causing working vehicle 5 to perform automatic traveling. Vehicle onboard control unit 32 includes, in addition to a CPU not depicted, storage elements such as a ROM, RAM, and a flash ROM. Vehicle onboard control unit 32 achieves functions as the following respective means. The functions of the respective parts (3.3.1) to (3.3.5) are achieved by CPU processing software programs. The functions of the respective parts (3.3.6) and (3.3.7) are achieved by using storage areas of the storage elements.

(3.3.1) Unit control part: Controls detection unit 2 and tag reader unit 34.

(3.3.2) Information communicating part: Transmits the marker detection information to server apparatus 18 when magnetic marker 10 is detected, and receives the route information indicating the automatic traveling route from server apparatus 18.

(3.3.3) Straight arrival point setting part: In the automatic traveling route indicated by the route information, sets an intermediate point as a straight arrival point, at which working vehicle 5 can arrive by traveling in a straight line.

(3.3.4) Automatic traveling control part: Calculates control values such as a target steering angle and a target vehicle speed for automatic traveling toward the straight arrival point.

(3.3.5) Position identifying part: Identifies the vehicle position where working vehicle 5 is positioned.

(3.3.6) Vehicle onboard marker database (vehicle onboard marker DB) 320: Database similar to marker DB 185M of server apparatus 18. By referring to this vehicle onboard marker DB 320 when tag-equipped marker 10 is detected, magnetic marker 10 can be identified.

(3.3.7) Marker history storage part 321: Stores a marker passing count indicating a count of detections of magnetic markers 10 as detection history of magnetic markers 10. The marker passing count for each combination of the magnetic polarity of magnetic marker 10 detected immediately before and the magnetic polarity of magnetic marker 10 newly detected is stored. There are four types of marker passing counts, that is, an (N-N) marker passing count, an (S-S) marker passing count, an (N-S) marker passing count, and an (S-N) marker passing count. Note that at the start of the remote control, the magnetic polarity of magnetic marker 10 at the starting point corresponding to a departure point is stored as the magnetic polarity of magnetic marker 10 detected immediately before.

Here, as a route as a target for taking the marker passing count, a route with a point whose position is identified taken as a starting point (reference) is set. For example, the starting point can be, in addition to the departure point, a left-turn point, a right-turn point, and so forth of working vehicle 5, tag-equipped marker 10 with its address identifiable by using the tag information, and so forth. And, these points can be the starting point of the route as the target for taking the marker passing count.

Next, description is made to (1) the marker detection process and (2) general operation of working vehicle system 1.

(1) Marker Detection Process

The marker detection process is a process to be performed by sensor array 21 of detection unit 2. Sensor array 21 performs the marker detection process by using magnetic sensors Cn in the cycle of 3 kHz. Note that when magnetic marker 10 is detected, a process of reading tag information is performed by tag reader unit 34.

As described above, magnetic sensors Cn are configured to measure magnetic components in the forwarding direction and the vehicle-width direction of working vehicle 5. For example, when these magnetic sensors Cn move in the forwarding direction to pass directly above magnetic marker 10, a magnetic measurement value in the forwarding direction has its sign reversed before and after magnetic marker 10 as in FIG. 7 and changes so as to cross zero at a position directly above magnetic marker 10. Therefore, during traveling of working vehicle 5, when zero-cross Zc occurs in which the sign of the magnetic measurement value in the forwarding direction detected by any magnetic sensor Cn is reversed, it can be determined that detection unit 2 is positioned directly above magnetic marker 10. Detection processing circuit 212 determines that magnetic marker 10 is detected when detection unit 2 is positioned directly above magnetic marker 10 and zero-cross Zc of the magnetic measurement value in the forwarding direction occurs as described above.

Also, for example, as for a magnetic sensor with the same specification as that of magnetic sensors Cn, assume movement along a virtual line in the vehicle-width direction passing directly above magnetic marker 10. In this case, the magnetic measurement value in the vehicle-width direction has its sign reversed on both sides across magnetic marker 10 and changes so as to cross zero at a position directly above magnetic marker 10. In the case of detection unit 2 having fifteen magnetic sensors Cn arrayed in the vehicle-width direction, the sign of the magnetic measurement value in the vehicle-width direction to be detected by magnetic sensor Cn varies depending on which side the magnetic sensor Cn is present with respect to magnetic marker 10 (FIG. 8).

FIG. 8 is a diagram exemplarily depicting a distribution of magnetic measurement values of respective magnetic sensors Cn of detection unit 2 in the vehicle-width direction. Based on the distribution of that drawing, an intermediate position between adjacent two magnetic sensors Cn across zero-cross Zc where the sign of the magnetic measurement value in the vehicle-width direction is reversed, or a position directly below magnetic sensor Cn where the detected magnetic measurement value in the vehicle-width direction is zero and the signs of the magnetic measurement values of magnetic sensors Cn on both outer sides are reversed, is a position of magnetic marker 10 in the vehicle-width direction. Detection processing circuit 212 measures a deviation of the position of magnetic marker 10 in the vehicle-width direction with respect to the center position (position of magnetic sensor C8) of detection unit 2 as the above-described lateral shift amount. For example, in the case of FIG. 8, the position of zero-cross Zc is a position corresponding to C9.5 in the neighborhood of a midpoint between C9 and C10. As described above, since the pitch between magnetic sensors C9 and C10 is 10 cm, the lateral shift amount of magnetic marker 10 is (9.5−8)×10 cm=15 cm with reference to C8 positioned at the center of detection unit 2 in the vehicle-width direction.

Note that the signs on both sides of zero-cross Zc in the distribution of the magnetic measurement values in FIG. 7 and FIG. 8 are reversed depending on whether the magnetic polarity of magnetic marker 10 is the N pole or the S pole. In the distribution of the magnetic measurement values in FIG. 7 or FIG. 8, detection processing circuit 212 detects the magnetic polarity of magnetic marker 10 in accordance with the position relation between a positive sign and a negative sign on both sides of zero-cross Zc.

(2) Operation of Working Vehicle System

Next, the operation of working vehicle system 1 is described with reference to FIG. 9 to FIG. 12. FIG. 9 is a flow diagram depicting a flow of a remote control start process by server apparatus 18. FIG. 10 exemplarily depicts automatic traveling route 1R calculated by this start process. FIG. 11 is a flow diagram depicting a flow of automatic traveling control to be performed by working vehicle 5 while being remotely controlled. FIG. 12 is a flow diagram depicting a flow of a process to be performed by server apparatus 18 during remote control. In the following, description is made to an example of a process operation when working vehicle conveys container 102 from marshalling yard 105 toward loading/unloading area 107.

For remote control of working vehicle 5, server apparatus 18 presents a work detail input screen, not depicted, to a work operator for setting predetermined details of a work to be performed by working vehicle 5. On this work detail input screen, for example, by operating an input device such as a mouse or a keyboard, it is possible to input details of the work to be performed by working vehicle 5. The details of the work include information about the receiving place where working vehicle 5 receives containers 102, the delivery place where working vehicle 5 delivers containers 102, and so forth. As the receiving place and the delivery place, for example, it is possible to designate the address of magnetic marker 10 in marshalling yard 105 or loading/unloading area 107.

As in FIG. 9, server apparatus 18 first sets a destination in accordance with the details of the work including the receiving place, the delivery place, and so forth inputted by the work operator on the work detail input screen (S101). Subsequently, server apparatus 18 calculates automatic traveling route 1R for moving to the destination set at step S101 described above (S102).

Here, during a period after working vehicle 5 departs by taking the current location as the departure point until arriving at the receiving place, this receiving place is the destination of working vehicle 5. Also, in a period after containers 102 are loaded at the receiving place until working vehicle 5 arrives at the delivery place, this delivery place is the destination of working vehicle 5. Note that the current location of working vehicle 5 serving as the departure point for remote control is stored by server apparatus 18 as a final arrival place (absolute position) at the time of the previous remote control.

In working vehicle system 1 of the present embodiment, the address where each magnetic marker 10 is positioned is a stop location of working vehicle 5. Therefore, the current location of working vehicle 5 can be identified by shifting the absolute position of magnetic marker 10 at the stop location by a relative position such as the lateral shift amount of working vehicle 5 with respect to magnetic marker 10 at the stop location or the movement amount after this magnetic marker 10 is detected.

In the following, description is exemplarily made to a case in which, as in FIG. 10, automatic traveling route 1R is determined by calculation. Automatic traveling route 1R is a route from magnetic marker 10 at an address (receiving place) on the 8th row and the 14th column in marshalling yard 105 as the starting point to a destination (delivery place) on the 14th row and the 30th column in loading/unloading area 107 by traveling in a straight line along the row and turning left at an address on the 8th row and the 30th column as a left-turn point.

Upon calculating automatic traveling route 1R as at step S102 described above, server apparatus 18 transmits, toward working vehicle 5, the route information indicating this automatic traveling route 1R (S103). This route information includes information about the address on the 8th row and the 14th column corresponding to the departure point, the address on the 8th row and the 30th column as the left-turn point, and the address on the 14th row and the 30th column as the destination.

Upon receiving the above-described route information, as in FIG. 11, vehicle onboard control unit 32 of working vehicle 5 first sets the straight arrival point at which working vehicle 5 can arrive by traveling in a straight line from the departure point along the row or the column (S201). In the case of the above-described route information, vehicle onboard control unit 32 sets the left-turn point (the 8th row and the 30th column) at which working vehicle 5 can arrive by traveling in the straight line from the departure point (the 8th row and the 14th column) along the row as the straight arrival point. Furthermore, newly setting the straight arrival point, vehicle onboard control unit 32 resets each of the above-described four types of the marker passing counts ((N-N), (S-S), (N-S), (S-N)) to zero (S202).

Subsequently, vehicle onboard control unit 32 starts automatic traveling control P1 for traveling toward the straight arrival point (the 8th row and the 30th column) set at step S201 described above. In this automatic traveling control P1, in addition to azimuth control of working vehicle 5 for traveling along the 8th row, the results of azimuth estimation and relative position estimation by inertial navigation are utilized.

During a period after working vehicle 5 departs from magnetic marker 10 (the 8th row and the 14th column) as the starting point (reference) until detecting next magnetic marker 10, relative position estimation by inertial navigation is repeatedly performed and used for automatic traveling control P1. During this period, vehicle onboard control unit 32 controls sensor array 21 to cause the above-described marker detection process P2 to be repeatedly performed (S203: NO). Note that marker detection process P2 when magnetic marker 10 is detected includes measurement of the lateral shift amount with respect to magnetic marker 10, detection of the magnetic polarity of detected magnetic marker 10, and so forth.

When new magnetic marker 10 is detected (S203: YES), vehicle onboard control unit 32 first determines whether a combination of the magnetic polarity of immediately-previous magnetic marker 10 and the magnetic polarity of newly-detected magnetic marker 10 is appropriate (S204). For example, in the case of automatic traveling route 1R (FIG. 10) along the 8th row where N-pole magnetic markers 10N are arrayed as described above, N-pole magnetic markers 10N are supposed to be consecutively detected. Thus, if the magnetic polarities of immediately-previous magnetic marker 10 and newly-detected magnetic marker 10 are both the N pole, vehicle onboard control unit 32 determines that the magnetic polarity combination is appropriate (S204: YES). On the other hand, if the magnetic polarity combination is other than that (S204: NO), automatic traveling control is suspended, and the process proceeds to predetermined error process E1. Note that as error process E1, it is preferable to adopt, for example, a process of stopping working vehicle 5 and calling an operator.

If the combination of the magnetic polarity of previously-detected magnetic marker 10 and the magnetic polarity of newly-detected magnetic marker 10 is appropriate (S204: YES), vehicle onboard control unit 32 controls tag reader unit 34 to cause tag reading process P3 for reading tag information to be performed. For example, since magnetic marker 10 on the 8th row and the 15th column immediately after departure from the starting point does not have RFID tag 15 annexed thereto, it is impossible to read tag information. If the tag information cannot be read, that is, if newly-detected magnetic marker 10 is non-tag marker 10 (S204: NO), vehicle onboard control unit 32 increments the marker passing count stored in marker history storage part 321 described above by one (S216). Note that, as described above, there are four types of marker passing counts corresponding to magnetic polarity combinations. At step S216 described above, the marker passing count corresponding to the magnetic polarity combination determined at step S204 described above is incremented by one.

Then, vehicle onboard control unit 32 identifies newly-detected magnetic marker 10 by using this marker passing count (S217). For example, when working vehicle 5 travels along a N-pole row to a direction in which the column number ascends (column ascending direction), vehicle onboard control unit 32 identifies an address obtained by adding the (N-N) marker passing count to the column number at the address (the 8th row and the 14th column) corresponding to the departure point as the address of newly-detected magnetic marker 10 (second position identifying part).

When working vehicle 5 is automatically traveling, vehicle onboard control unit 32 performs the process from step S203: YES to S217 described above whenever detecting non-tag marker 10 and increments the marker passing count by one. For example, when the working vehicle moves from the address on the 8th row and the 14th column as the starting point along the row and the (N-N) marker passing count indicates three in response to detection of magnetic markers 10, vehicle onboard control unit 32 increments the column number of the address of the starting point, the 8th row and the 14th column, by three, thereby identifying magnetic marker 10 on the 8th row and the 17th column.

For example, when working vehicle 5 moves along the 8th row and arrives at tag-equipped marker 10 on the 8th row and the 19th column, in response to detection of that tag-equipped marker 10 (S203: YES), reading of tag information can be made (S205: YES). With reference to vehicle onboard marker DB 320 by using the tag ID included in the tag information, vehicle onboard control unit 32 identifies detected tag-equipped marker 10 (S206, first position identifying part). Also, vehicle onboard control unit 32 sets detected tag-equipped marker 10 as the starting point of a new route, and resets all of the marker passing counts to zero (S207).

Note that it can be thought that working vehicle 5 has arrived at tag-equipped marker 10 but cannot read the tag information due to influence of a flood or the like. In this case, by the process after step S205: NO onward described above, tag-equipped marker 10 is merely handled as non-tag marker 10. In this manner, in the process of working vehicle 5 depicted in FIG. 11, the process does not fail due to a failure in tag information reading. This handling is similarly applied to the process of server apparatus 18 in FIG. 12, which will be described further below.

If detected magnetic marker 10 has been identified irrespective of whether the marker is tag-equipped marker 10 or non-tag marker 10, vehicle onboard control unit 32 generates the marker detection information and transmits this information to server apparatus 18 (S208). This marker detection information includes information indicating that magnetic marker 10 has been detected, information about the magnetic polarity of magnetic marker 10, and the tag ID (tag information) in the case of tag-equipped marker 10.

After transmitting the marker detection information in this manner, vehicle onboard control unit 32 determines whether working vehicle 5 has arrived at the straight arrival point set at step S201 described above (S209). Specifically, it is determined whether the address of magnetic marker 10 identified at step S206 or step S217 described above matches the address of the straight arrival point. When working vehicle 5 is positioned not at the straight arrival point but at a position short thereof (S209: NO), vehicle onboard control unit 32 continues automatic traveling control P1, and repeatedly performs the process at step S203 onward described above subsequently to marker detection process P2.

On the other hand, if working vehicle 5 has arrived at the straight arrival point, that is, if the address of magnetic marker 10 identified at step S206 or step S217 described above matches the address of the straight arrival point (S209: YES), vehicle onboard control unit 32 further determines whether that straight arrival point is the destination (S210). If working vehicle 5 has arrived at the destination (S210: YES), automatic traveling control ends.

If working vehicle 5 has arrived at the straight arrival point that is not the destination (S210: NO), vehicle onboard control unit 32 returns to step S201 described above and sets a new straight arrival point. Furthermore, vehicle onboard control unit 32 resets each marker passing count to zero for setting magnetic marker 10 corresponding to the position of working vehicle 5 at that time as the starting point of a route to the new straight arrival point (S202), and then continues automatic traveling control P1.

For example, as described above, for automatic traveling route 1R (FIG. 10) from the address on the 8th row and the 14th column as the starting point to the destination at the address on the 14th row and the 30th column via a left turn at the address on the 8th row and the 30th column, the left-turn point on the 8th row and the 30th column is the straight arrival point. Furthermore, after passing this left-turn point, the address on the 14th row and the 30th column as the destination is the straight arrival point.

As in FIG. 12, while remotely controlling working vehicle 5, server apparatus 18 waits for reception of the marker detection information transmitted from working vehicle 5 (S301: NO). Then, whenever receiving the marker detection information (S301: YES), server apparatus 18 determines whether the tag ID (tag information) is included (S302). When the tag ID is included (S302: YES), server apparatus 18 refers to marker DB 185M by using that tag ID, and identifies the position of the corresponding magnetic marker 10 (S303). Then, server apparatus 18 stores and manages the address (position) of identified magnetic marker 10 as the vehicle position of working vehicle 5.

On the other hand, when the tag ID is not included in the marker detection information (S302: NO), server apparatus 18 identifies, as newly-detected magnetic marker 10, any of four magnetic markers 10 adjacent to one another in the row direction or the column direction with respect to the vehicle position of working vehicle 5 (address of magnetic marker 10) stored on the area map (S313).

As described above, in the present embodiment, for working vehicle 5 from marshalling yard 105 toward unloading are 107, movable directions are limited to directions in which the column number ascends along the row direction (column ascending direction) and a direction in which the row number ascends along the column direction (row ascending direction). Therefore, of four magnetic markers 10 described above, magnetic marker 10 detected by working vehicle 5 is any of two magnetic markers 10, that is, magnetic marker 10 positioned on a column-number ascending side and magnetic marker 10 positioned on a row-number ascending side.

According to the combination of the magnetic polarity of magnetic marker 10 (previously-detected magnetic marker 10) corresponding to the vehicle position stored in server apparatus 18 and the magnetic polarity of newly-detected magnetic marker 10, either of the two magnetic markers 10 described above can be selected in a determined manner. For example, when the magnetic polarity combination of previously-detected magnetic marker 10 and newly-detected magnetic marker 10 is an N-pole-N-pole or an S-pole-S-pole combination, magnetic marker 10 adjacent along the row can be identified as new magnetic marker 10. Also, for example, when the combination is an N-pole-S-pole or an S-pole-N-pole combination, magnetic marker 10 adjacent along the column can be identified as new magnetic marker 10.

Upon identifying magnetic marker 10 newly detected by working vehicle 5 as at step S303 or S313 described above, server apparatus 18 stores and manages the address of that magnetic marker 10 as the vehicle position of working vehicle 5 (S304). Furthermore, server apparatus 18 determines whether the newly stored vehicle position is on automatic traveling route 1R (FIG. 10) calculated at step S102 (FIG. 9) described above (S305). If working vehicle 5 is not positioned on automatic traveling route 1R (S305: NO), the process proceeds to error process E2. Note that, as error process E2, it is preferable to adopt, for example, the process of stopping working vehicle 5 and calling an operator.

If working vehicle 5 is positioned on automatic traveling route 1R (S305: YES), server apparatus 18 determines whether working vehicle 5 has arrived at the destination (S306). Then, if the working vehicle 5 has arrived at the destination, server apparatus 18 ends remote control (S306: YES). On the other hand, if working vehicle 5 is short of the destination, server apparatus 18 waits for reception of new marker detection information from working vehicle 5 (S306: NO). Then, if receiving marker detection information, server apparatus 18 performs the process subsequent to step S301 described above.

In working area (traveling area) 1A managed by working vehicle system (vehicular system) 1 configured as described above, RFID tag (wireless tag) 15 which outputs tag information is annexed to some of magnetic markers 10. In working vehicle system 1, when working vehicle 5 detects magnetic marker 10 having RFID tag 15 annexed thereto, magnetic marker 10 can be identified by using the tag ID included in the tag information, thereby allowing the vehicle position to be identified (first position identifying part).

Also, in working area (traveling area) LA at which working vehicle system (vehicular system) 1 is targeted, magnetic markers 10 are arranged in a predetermined pattern in which the magnetic polarity is different for each row of passages 108 forming a grid shape. Thus, in working vehicle system 1, in accordance with the combination of magnetic polarities of magnetic markers 10 detected by working vehicle 5, it is possible to identify whether working vehicle 5 has traveled along the row or along the column. For example, the magnetic polarity combination of N pole→N pole in which N-pole magnetic marker 10N is detected subsequently to detection of N-pole magnetic marker 10N, corresponds to traveling of working vehicle 5 along the row. For example, if the magnetic polarity combination of N pole→N pole repeats three time while working vehicle 5 is moving from marshalling yard 105 toward loading/unloading area 107, in working vehicle system 1, it is possible to identify traveling of working vehicle 5 in which the column number ascends by three along the row. In this manner, in working vehicle system 1 of the present embodiment, in accordance with the number of times of detection (marker passing count) of magnetic markers 10 and detection history of the magnetic polarity combinations and so forth during traveling of working vehicle 5, it is possible to identify the address of the place to which working vehicle 5 has moved (second position identifying part).

Working vehicle system 1 configured as described above is a system allowing the position of working vehicle 5 in working area 1A to be identified with high reliability, and can perform management, control, and so forth of working vehicles 5 moving in working area 1A with high reliability. This working vehicle system 1 can identify the vehicle positions of working vehicles 5 without presuming reception of GPS radio waves or the like. Thus, for example, even in a place alongside berthing container ships 101 or containers 102, and a place below crane 103 or the like where GPS radio waves become unstable, or in a facility at a harbor or the like where GPS accuracy may be intentionally suppressed, accuracy of identifying the vehicle position is not affected. With the use of the vehicle position identified by working vehicle system. 1, the location of working vehicle 5 can be managed with high accuracy, and reliable remote control can be achieved.

In particular, in working vehicle system 1, it is possible to identify magnetic marker 10 detected by working vehicle 5 by using detection history of magnetic markers 10. Thus, in this working vehicle system 1, it is not required to provide RFID tag 15 to all magnetic markers 10, and cost of laying magnetic markers 10 can be reduced. Also, since the number of RFID tags 15 per unit area can be reduced, the possibility of erroneous communication by tag reader unit 34 with another RFID tag 15 becomes less. For tag reader unit 34, since a filter circuit, a highly-directive antenna, or the like for ensuring communication accuracy is not required, hardware cost can be reduced.

Furthermore, in working vehicle system 1, if wireless communication with RFID tag 15 cannot be performed when tag-equipped marker 10 is detected, tag-equipped marker 10 is merely handled as the non-tag marker. Therefore, the position of working vehicle 5 is not missed due to failure in wireless communication with RFID tag 15. When magnetic marker 10 is flooded, wireless communication with RFID tag 15 tends to be unstable. However, in working vehicle system 1, the possibility that the system operation falls into an unstable state due to failure in reading the tag information is small.

Note that while the configuration has been exemplarily described in the present embodiment in which sheet-shaped RFID tag 15 is attached to the upper surface of magnetic marker 10, the configuration with magnetic marker 10 and RFID tag 15 integrated together is not a requisite. It is only required that magnetic marker 10 and RFID tag 15 be arranged at the same position, and RFID tag 15 may be arranged above or below magnetic marker 10 in the vertical direction.

Also, in the present embodiment, the configuration has been exemplarily described in which work details including a passing-through place, the destination, and so forth of working vehicle 5 are inputted, for example, by the work operator by using the input device such as the keyboard or the mouse. Alternatively, a processing apparatus inputting delivery information of containers 102 may determine necessary work by, for example, an artificial intelligence process and, in accordance with the determination, may determine the work details of each working vehicle 5.

Furthermore, in place of or in addition to IMU 22 described above, a unit may be adopted which detects the orientation of working vehicle 5 by using the rotation speed or the number of rotations for each wheel of four wheels included in working vehicle 5, or the steering angle of the steering wheel or the wheels to be steered. The rotation speed, the number of rotations, and so forth of each wheel can be measured by a relatively simple configuration in which a rotation sensor or the like is attached to each wheel. In this manner, with the adoption of the unit which detects the orientation of working vehicle 5 by using the steering angle, the rotation speed for each wheel, and so forth, while an increase in cost on the working vehicle 5 side is reduced, estimation of the relative position by inertial navigation and so forth can be made.

In the present embodiment, the configuration is exemplarily depicted in which working vehicle 5 receiving the route information from server apparatus 18 autonomously travels. In place of this, a configuration may be adopted in which server apparatus 18 remotely controls working vehicles 5 for automatic traveling.

The configuration has been exemplarily described in which marker DB 185M in which laying positions of magnetic markers 10 are managed, each linked to the tag ID of RFID tag 15, is provided to a server apparatus 18 side and each working vehicle 5 includes vehicle onboard marker DB 320 identical to marker DB 185M. In place of this, it may be configured such that each working vehicle 5 accesses marker DB 185M of server apparatus 18 via wireless communication.

Note that the configuration of identifying the vehicle position of each working vehicle 5 in working vehicle system 1 of the present embodiment is useful not only for a system in which working vehicles 5 are caused to automatically travel by remote control or autonomous control, but also for a system for managing, on the server apparatus 18 side with high accuracy, the position of working vehicle 5 being driven by a worker.

In the present embodiment, the configuration has been exemplarily described in which server apparatus 18 stores the vehicle position of working vehicle 5 and updates that vehicle position as occasion arises when the new magnetic marker 10 is detected. In place of this, on a route with magnetic marker 10 corresponding to the departure point as the starting point, detection history of magnetic markers 10 by working vehicle 5 may be stored in server apparatus 18. For example, as the detection history, history of magnetic polarity combinations of the previously-detected magnetic marker and the newly-detected magnetic marker may be stored.

For example, consider a case in which working vehicle 5 moves along a route indicated by an arrow in FIG. 13. Note that the route in the drawing is a route different from automatic traveling route 1R depicted in FIG. 10. Working vehicle 5 moving along this route departs from N-pole magnetic marker 10N on the 5th row and the 3rd column as the starting point of the route and then sequentially detects N-pole magnetic marker 10N on the 5th row and the 4th column, N-pole magnetic marker 10N on the 5th row and the 5th column, S-pole magnetic marker 10S on the 6th row and the 5th column, S-pole magnetic marker 10S on the 6th row and the 6th column, and N-pole magnetic marker 10N on the 7th row and the 6th column.

Here, on server apparatus 18, the detection history of FIG. 14 is recorded. Numbers in the drawing are numbers representing a temporal order, with No. 1 corresponding to the temporally oldest history. For example, in this detection history, an (N-N) history of No. 2 represents a movement along the 5th row of detecting N-pole magnetic marker 10N on the 5th row and the 4th column and then N-pole magnetic marker 10N on the 5th row and the 5th column. Also, an (S-N) history of No. 5 represents a movement along the 6th column of detecting S-pole magnetic marker 10S on the 6th row and the 6th column and then N-pole magnetic marker 10N on the 7th row and the 6th column. In this manner, according to the detection history of FIG. 14, the movement route of FIG. 13 can be reproduced.

In the detection history of FIG. 14, the history count without switching of magnetic polarity, such as (N-N) and (S-S), and the history count with switching of magnetic polarity, such as (N-S) and (S-N), may be individually totalized. In the detection history of FIG. 14, the history count without switching of magnetic polarity is three, and the history count with switching of magnetic polarity is two. The history without switching of magnetic polarity is the history corresponding to movements along the row direction, and the history with switching of magnetic polarity is the history corresponding to movements along the column direction. Therefore, a movement with the history count without switching of magnetic polarity of three and a history count with switching of magnetic polarity of two corresponds to, as in FIG. 15, a movement with the row number incremented by two and the column number incremented by three, with respect to magnetic marker 10 on the 5th row and the 3rd column at the starting point. According to this movement, working vehicle 5 arrives at magnetic marker 10 on the 7th row and the 6th column by taking magnetic marker 10 on the 5th row and the 3rd column as the starting point.

In the configuration example of FIG. 13 and FIG. 14, the moving directions of working vehicle 5 are limited to two directions, that is, the direction in which the column number ascends along the row direction (column-ascending direction) and the direction in which the row number ascends along the column direction (row-ascending direction). In place of this, the configuration may be such that working vehicle 5 can move to four directions, that is, upward, downward, leftward, and rightward directions, along the passages 108 in the grid shape. In this case, moving direction is preferably recorded in addition to each of the histories of No. 1 to No. 5 exemplarily depicted in FIG. 14. With azimuth information indicating any direction of four orthogonal directions, that is, upward, downward, leftward, and rightward directions, included in the marker detection information transmitted by working vehicle 5, detection history exemplarily depicted in FIG. 16 can be generated. The azimuth information may be information based on, for example, the azimuth measured by IMU 22.

Also, as for the moving directions of working vehicle 5, in addition to four directions along rows and columns, an diagonally moving pattern may be added. An diagonal movement can be detected by using the azimuth measured by IMU 22. For example, the diagonal movement may be allowed only when making a detour around another stopping working vehicle 5, crossing working vehicle 5 moving in an opposite direction, and so forth. With adoption of this configuration, an increase in movement distance required by the working vehicle avoiding another working vehicle is suppressed, and the avoiding operation can be efficiently performed.

Also, for example, the configuration may be such that the movement from marshalling yard 105 toward loading/unloading area 107 is achieved only by an diagonal movement and an oppositely oriented movement is achieved only by vertical and horizontal movements. With adoption of this configuration, overlapping sections of a movement route of working vehicle 5 moving from marshalling yard 105 toward the loading/unloading area 107 and a movement route of oppositely oriented working vehicle 5 are grid points only, and overlapping portions can be decreased. And, this can reduce the degree of interference between working vehicle 5 moving from marshalling yard 105 toward loading/unloading area 107 and oppositely oriented working vehicle 5, and can improve movement efficiency. Alternatively, in accordance with the degree of urgency of work, container conveying works may be ranked. For example, ranks include rush, normal, and so forth. For example, preferably, while the shortest movement route including the diagonal movement is set for a rush conveying work, a movement route only with vertical and horizontal movements is set for a normal conveying work. In this case, the movement distance required for the rush conveying work can be shortened, and the working time can be reduced.

As depicted in FIG. 1, while the pattern has been exemplarily described in which the magnetic polarity of magnetic markers 10 is switched for each row in traveling area LA provided with passages 108 in the grid shape, the magnetic polarity may be switched for each column, alternatively. The magnetic polarity patterns are not limited to these pattern. Any pattern in which the magnetic polarity is switched with constant regularity is relevant to the predetermined pattern.

In the present embodiment, traveling area 1A provided with passages 108 in the grid shape has been exemplarily described, and, as shapes forming the grid, a grid of squares with 10-meter pitches in each of vertical and horizontal directions is exemplarily described. Shapes forming the grid are not limited to squares, and may be rectangles, parallelograms, rhombus, triangles, or the like. As with the present embodiment, the magnetic marker is preferably arranged at each grid point forming an apex of each shape of the grid.

Furthermore, in the present embodiment, as the size of the shape of the grid, the size with 10-m pitches in each of vertical and horizontal directions has been exemplarily described. A plurality of types of size may be set. For example, a configuration may be adopted in which while the size of the shape forming the grid on a sea side is set small, the size of the shape forming the grid on a land side is set large, or a configuration may be adopted in which while the size of the shape forming the grid in an area where containers are loaded/unloaded is set small, the size of the shape forming the grid in the other areas where working vehicles pass is set large. Still further, a rectangular grid shape in which the distance between rows and the distance between columns are different may be provided. In this case, while the distance between columns may be set at, for example, 10 meters, the distance between rows in an area where containers are loaded/unloaded may be finely set at, for example, 5 meters, and the distance between rows in the other areas where working vehicles pass may be coarsely set at, for example, 10 meters.

Second Embodiment

The present embodiment is an example in which the vehicular system of the first embodiment is applied to a road where a vehicle travels. Details of this are described with reference to FIG. 17 and FIG. 18.

As in FIG. 17, on the road with two lanes on each side, the magnetic polarities of magnetic markers 10 may be varied for each lane, RFID tag 15 may be annexed to some of magnetic markers 10. In the drawing, an example based on the configuration of the first embodiment is depicted in which, as a vehicle traveling area, the road is assumed in which a vehicle moving direction is prescribed for each lane.

In application to the road with two lanes on each side depicted in FIG. 17, when a vehicle passes over magnetic marker 10 (tag-equipped marker, as shown with a circle therearound in the drawing) having RFID tag 15 annexed thereto, the vehicle position can be identified base on the laying position of that tag-equipped marker 10. Then, during a period in which detection of magnetic marker 10 with the same magnetic polarity is repeated, it is possible to determine that the vehicle travels without a lane change. By counting the number of times of detection of magnetic marker 10 (marker passing count) after tag-equipped marker 10 is detected, irrespective of whether RFID tag 15 is annexed, it is possible to identify detected magnetic marker 10 and, based on its laying position, identify the vehicle position.

Also in the configuration of the present embodiment, as with the first embodiment, a marker DB storing information regarding each magnetic marker 10 is preferably provided. In the marker DB, information preferably stored are, in addition to the absolute position and the magnetic polarity of magnetic marker 10, the address indicated by an order number, a lane type such as a traveling lane or a passing lane, inbound/outbound information, and so forth. Furthermore, the information regarding tag-equipped marker 10 is preferably linked to (associated with) the tag ID (tag information), which is identification information of annexed RFID tag 15. For example, by adding the count of passing over magnetic markers 10 to the address of tag-equipped marker 10 detected immediately before, the address of newly-detected magnetic marker 10 can be identified, thereby allowing the laying position and so forth to be identified. With adoption of this configuration, for example, even if reading of the tag information of tag-equipped marker 10 fails and the marker is detected as non-tag marker 10, the address of new magnetic marker 10 can be identified irrespective of the failure in reading the tag information.

The configuration of the vehicular system of the first embodiment may be applied to BRT (Bus Rapid Transit) exemplarily depicted in FIG. 18 for ensuring timeliness and reinforcing transport capacity by using a bus lane, a coupled bus, or the like. For example, preferably, of operation routes for buses connecting an urban area and a residential area, while N-pole magnetic markers 10N are arranged on an inbound route toward the urban area, S-pole magnetic marker 10S are arranged on an outbound route toward the residential area. While RFID tag 15 is annexed to some of magnetic markers 10 (magnetic markers each shown with a circle therearound in FIG. 18), as with the case of FIG. 17 described above, the address, the laying position, and so forth of each magnetic marker 10 is preferably managed in the marker DB. By taking the marker passing count after passing of tag-equipped marker 10, it is possible to identify the address of newly-detected magnetic marker 10 and identify the laying position. Also, with repetition of detection of magnetic marker 10 with the same magnetic polarity, a movement of the bus along the inbound or outbound route can be confirmed.

Note that other configurations, operations and effects are similar to those of the first embodiment.

In the foregoing, specific examples of the present invention are described in detail as in the embodiments, these specific examples merely disclose examples of technology included in the scope of the claims. Needless to say, the scope of the claims should not be restrictively construed based on the configuration, numerical values, and so forth of the specific examples. The scope of the claims includes techniques acquired by variously modifying, changing, or combining as appropriate the above-described specific examples by using known techniques, knowledge of a person skilled in the art, and so forth.

REFERENCE SIGNS LIST

1 working vehicle system (vehicular system)
1A working area (traveling area)
1R route (automatic traveling route)
10 magnetic marker
105 marshalling yard
107 loading/unloading area
15 RFID tag (wireless tag)
18 server apparatus (position identifying part, route calculating part, remote control part)
185M marker database (marker DB)
185R vehicle position storage part
185T map database (map DB)
2 detection unit
21 sensor array
212 detection processing circuit
22 IMU
32 vehicle onboard control unit (unit control part, information communicating part, straight arrival point setting part, automatic traveling control part, position identifying part)
320 vehicle onboard marker database (vehicle onboard marker DB)
321 marker history storage part
34 tag reader unit
5 working vehicle (vehicle)
61 vehicle ECU

The invention claimed is:

1. A vehicular system where a vehicle moves in a traveling area including grid points where passages intersect each other, wherein
   in the traveling area, magnetic markers as magnetism generation sources are arranged at each of the grid points where the passages intersect each other so that magnetic polarities form a predetermined pattern, and a wireless tag which outputs tag information via wireless communication is attached to some of the magnetic markers, the tag information allowing a position of the some of the magnetic markers to be identified,
   the system comprises:
   a first position identifying part configured to identify a magnetic marker detected by the vehicle by using the tag information, and configured to identify a first vehicle position where the vehicle is located based on the position of the magnetic marker; and
   a second position identifying part configured to identify a magnetic marker newly detected by the vehicle by using detection history indicating history information of the magnetic marker detected by the vehicle, the detection history including information about the magnetic polarity of the magnetic marker detected, and configured to identify a second vehicle position based on the position of the magnetic marker newly detected, and
   the second position identifying part is configured to identify, for each of the grid points in a route where the vehicle has moved from an identified position as a starting point, a passage traveled by the vehicle among the passages crossing at the grid point by using the predetermined pattern and the detection history regarding the magnetic polarity of the magnetic marker in the traveling area, thereby configured to identify a destination point to which the vehicle has moved through the route, and configured to identify a magnetic marker arranged at the destination point to which the vehicle has moved as the magnetic marker newly detected by the vehicle, wherein in the traveling area, passages in a row direction and passages in a column direction allowing the vehicle to move form a grid shape, and the magnetic markers are arranged at the grid points where any of the passages crosses another one of the passages.

2. The vehicular system in claim 1, wherein,
the predetermined pattern is a pattern in which the magnetic polarities of the magnetic markers are alternately switched amongst adjacent rows or are switched amongst adjacent columns.

3. The vehicular system in claim 2, wherein
the detection history includes a marker passing count indicating a count of detections of the magnetic markers detected by the vehicle, and the second position identifying part is configured to identify the vehicle position by using the marker passing count.

4. The vehicular system in claim 3, wherein
the detection history includes a combination of the magnetic polarities of the at least two magnetic markers detected by the vehicle, and
the second position identifying part is configured to identify a passage traveled by the vehicle passing over the grid point where the passages intersect each other by using the combination of the magnetic polarities of the at least two magnetic markers.

5. The vehicular system in claim 2, wherein
the detection history includes a combination of the magnetic polarities of the at least two magnetic markers detected by the vehicle, and
the second position identifying part is configured to identify a passage traveled by the vehicle passing over the grid point where the passages intersect each other by using the combination of the magnetic polarities of the at least two magnetic markers.

6. The vehicular system in claim 2, wherein
each of the some of the magnetic markers is configured integrally with the wireless tag.

7. The vehicular system in claim 1, wherein
the detection history includes a marker passing count indicating a count of detections of the magnetic markers detected by the vehicle, and the second position identifying part is configured to identify the vehicle position by using the marker passing count.

8. The vehicular system in claim 7, wherein
the detection history includes a combination of the magnetic polarities of the at least two magnetic markers detected by the vehicle, and
the second position identifying part is configured to identify a passage traveled by the vehicle passing over the grid point where the passages intersect each other by using the combination of the magnetic polarities of the at least two magnetic markers.

9. The vehicular system in claim 7, wherein
each of the some of the magnetic markers is configured integrally with the wireless tag.

10. The vehicular system in claim 1, wherein
the detection history includes a combination of the magnetic polarities of the at least two magnetic markers detected by the vehicle, and the second position identifying part is configured to identify a passage traveled by the vehicle passing over the grid point where the passages intersect each other by using the combination of the magnetic polarities of the at least two magnetic markers.

11. The vehicular system in claim 10, wherein
each of the some of the magnetic markers is configured integrally with the wireless tag.

12. The vehicular system in claim 1, wherein
each of the some of the magnetic markers is configured integrally with the wireless tag.

13. The vehicular system in claim 1, wherein
the detection history includes a marker passing count indicating a count of detections of the magnetic markers detected by the vehicle, and the second position identifying part is configured to identify the vehicle position by using the marker passing count.

14. The vehicular system in claim 13, wherein
the detection history includes a combination of the magnetic polarities of the at least two magnetic markers detected by the vehicle, and
the second position identifying part is configured to identify a passage traveled by the vehicle passing over the grid point where the passages intersect each other by using the combination of the magnetic polarities of the at least two magnetic markers.

15. The vehicular system in claim 13, wherein
each of the some of the magnetic markers is configured integrally with the wireless tag.

16. The vehicular system in claim 1, wherein
the detection history includes a combination of magnetic polarities of the at least two magnetic markers detected by the vehicle, and
the second position identifying part is configured to identify a passage traveled by the vehicle passing over the grid point where the passages intersect each other by using the combination of the magnetic polarities of the at least two magnetic markers.

17. The vehicular system in claim 16, wherein
each of the some of the magnetic markers is configured integrally with the wireless tag.

18. The vehicular system in claim 1, wherein
the second position identifying part is configured to identify whether the vehicle has moved on a passage along the row direction or the column direction in accordance with whether a magnetic polarity of the magnetic marker newly detected by the vehicle and a magnetic polarity of a magnetic marker detected immediately before match each other.

19. The vehicular system in claim 1, wherein
the system comprises an electronic compass which measures an azimuth of the vehicle, and the detection history includes azimuth information indicating the azimuth of the vehicle, and
the second position identifying part is configured to identify a passage traveled by the vehicle passing over the grid point where passages intersect each other by using the azimuth information.

20. The vehicular system in claim 1, wherein
the second position identifying part is configured to set the magnetic marker identified by the first position identifying part as the starting point of the route.

* * * * *